(12) United States Patent
Chubachi

(10) Patent No.: US 9,374,491 B2
(45) Date of Patent: Jun. 21, 2016

(54) SENSOR DEVICE, IMAGE FORMING APPARATUS, AND CONTROL METHOD FOR LIGHT SOURCE

(71) Applicant: Sunao Chubachi, Miyagi (JP)

(72) Inventor: Sunao Chubachi, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/709,872

(22) Filed: May 12, 2015

(65) Prior Publication Data

US 2015/0334263 A1    Nov. 19, 2015

(30) Foreign Application Priority Data

May 14, 2014   (JP) ................. 2014-100074

(51) Int. Cl.
| | |
|---|---|
| *H04N 1/04* | (2006.01) |
| *H04N 1/028* | (2006.01) |
| *B41J 11/00* | (2006.01) |
| *G03G 15/00* | (2006.01) |

(52) U.S. Cl.
CPC ........... *H04N 1/02815* (2013.01); *B41J 11/009* (2013.01); *G03G 15/5029* (2013.01); *G03G 15/607* (2013.01); *G03G 2215/00324* (2013.01); *G03G 2215/00616* (2013.01)

(58) Field of Classification Search
CPC .............. H04N 2201/0081; H04N 2201/0094; H04N 9/3129; H04N 1/00034; H04N 1/00037; H04N 1/00588; H04N 1/00689; H04N 1/00708; H04N 1/00748; H04N 1/00891; H04N 1/00896; H04N 1/00997; H04N 9/3182
USPC ........ 358/475, 509, 406, 474, 1.14, 449, 451, 358/461, 488, 497, 498, 518; 399/16, 32, 399/358, 359, 53, 9
See application file for complete search history.

(56) References Cited

U.S. PATENT DOCUMENTS

| | | | | |
|---|---|---|---|---|
| 5,267,059 | A | * | 11/1993 | Kawabata et al. ............ 358/498 |
| 6,700,618 | B1 | * | 3/2004 | Chubachi ........... H04N 5/23212 348/345 |
| 2007/0047157 | A1 | | 3/2007 | Miyahara et al. |
| 2007/0146818 | A1 | * | 6/2007 | Horiguchi ..................... 358/474 |
| 2009/0096855 | A1 | * | 4/2009 | Foo et al. ...................... 347/237 |
| 2012/0134693 | A1 | * | 5/2012 | Hoshi et al. ..................... 399/45 |
| 2013/0057868 | A1 | * | 3/2013 | Oba et al. ...................... 356/445 |
| 2013/0194573 | A1 | | 8/2013 | Ohba et al. |
| 2013/0243446 | A1 | * | 9/2013 | Masuda ......................... 399/16 |
| 2014/0160538 | A1 | * | 6/2014 | Tanaka .......................... 358/475 |
| 2015/0062582 | A1 | * | 3/2015 | Adachi et al. ................. 356/369 |

FOREIGN PATENT DOCUMENTS

| | | |
|---|---|---|
| EP | 2 843 475 A1 | 3/2015 |
| JP | 2012-127937 | 7/2012 |

OTHER PUBLICATIONS

Extended European Search Report issued on Sep. 16, 2015 in European Patent Application No. 15167402.5.

* cited by examiner

*Primary Examiner* — Negussie Worku
(74) *Attorney, Agent, or Firm* — Oblon, McClelland, Maier & Neustadt, L.L.P.

(57) ABSTRACT

A sensor device includes an irradiation unit that includes a light source and irradiates an object with light, an optical detection unit disposed on an optical path of light emitted from the irradiation unit and reflected at the object, at least one object sensor that detects presence of the object, and a controller that controls the light source based on output from the object sensor.

20 Claims, 27 Drawing Sheets

SPECULAR REFLECTION LIGHT

M

DIFFUSE REFLECTION LIGHT

M

INTERNAL REFLECTION LIGHT

M

SENSOR DEVICE, IMAGE FORMING APPARATUS, AND CONTROL METHOD FOR LIGHT SOURCE

CROSS-REFERENCE TO RELATED APPLICATIONS

This patent application is based on and claims priority pursuant to 35 U.S.C. §119(a) to Japanese Patent Application No. 2014-100074, filed on May 14, 2014, in the Japan Patent Office, the entire disclosure of which is hereby incorporated by reference herein.

BACKGROUND

1. Technical Field

The present invention relates to a sensor device, an image forming apparatus, and a control method for a light source, more specifically, relates to a sensor device suitable for identifying an object, an image forming apparatus including the sensor device, and a control method for a light source in the sensor device.

2. Description of the Related Art

In an image forming apparatus such as a digital copying machine and a laser printer, a toner image is transferred to a surface of a recording medium represented by a printing paper, and the image is fixed by performing heating and pressing under predetermined conditions, thereby forming an image. Important points to be considered in forming an image is conditions of a heating amount and pressure at the time of fixing the image, particularly in order to form a high-quality image, fixing conditions are needed to be individually set in accordance with a recording medium.

This is because image quality in the recording medium is largely affected by material quality, thickness, humidity, smoothness, coating condition, etc. of the recording medium. For example, as for smoothness, a toner fixing rate at a recessed portion in an uneven portion of a printing paper surface may be decreased by the fixing conditions. Therefore, when fixing is not performed under proper conditions suitable of the recording medium, color unevenness may occur.

Further, due to advancement of the image forming apparatus and diversification of a representation method in recent years, several hundred different types of printing papers exist only in terms of the printing paper. Moreover, a wide variety of brands exist in each type of the printing paper due to differences in specifications such as grammage and thickness. In order to achieve high-quality image forming, the fixing conditions are needed to be set in detail in accordance with each one of the brands.

Further, recently, the number of brands is also increased in terms of a regular paper, a coated paper represented by a gloss coated paper, a mat coated paper, and an art coated paper, a plastic sheet, and a special paper having a surface embossed.

In the current image forming apparatus, a user needs to set the fixing conditions by oneself at the time of printing. Therefore, the user is required to have knowledge to identify paper types, and further, the user is bothered to input setting content every time by oneself in accordance with the paper type. Also, in the case where the setting content is incorrect, an optimal image cannot be obtained.

In view of this, an optical sensor may be provided, which detects a type of paper before an image is formed on the paper.

For example, JP-2012-127937-A discloses an optical sensor including: an irradiation system that irradiates a surface of a sheet-like object with linear polarization in a first polarization direction from an incident direction tilted against a normal direction of the surface; a first optical detection system that includes a first optical detector disposed on an optical path of light regularly reflected at the object irradiated by the irradiation system; and a second optical detection system that includes an optical device and a second optical detector, the optical device being disposed on an optical path of light diffused and reflected at the object within an incidence plane of the object, and transmitting a linear polarization component in a second polarization direction orthogonal to the first polarization direction, and the second optical detector that receives the light transmissive through the optical device.

However, according to the optical sensor disclosed in JP-2012-127937-A, there may be a case where the light emitted from a light source leaks.

SUMMARY

Example embodiments of the present invention include a sensor device including an irradiation unit that includes a light source and irradiates an object with light, an optical detection unit disposed on an optical path of light emitted from the irradiation unit and reflected at the object, at least one object sensor that detects presence of the object, and a controller that controls the light source based on output from the object sensor.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
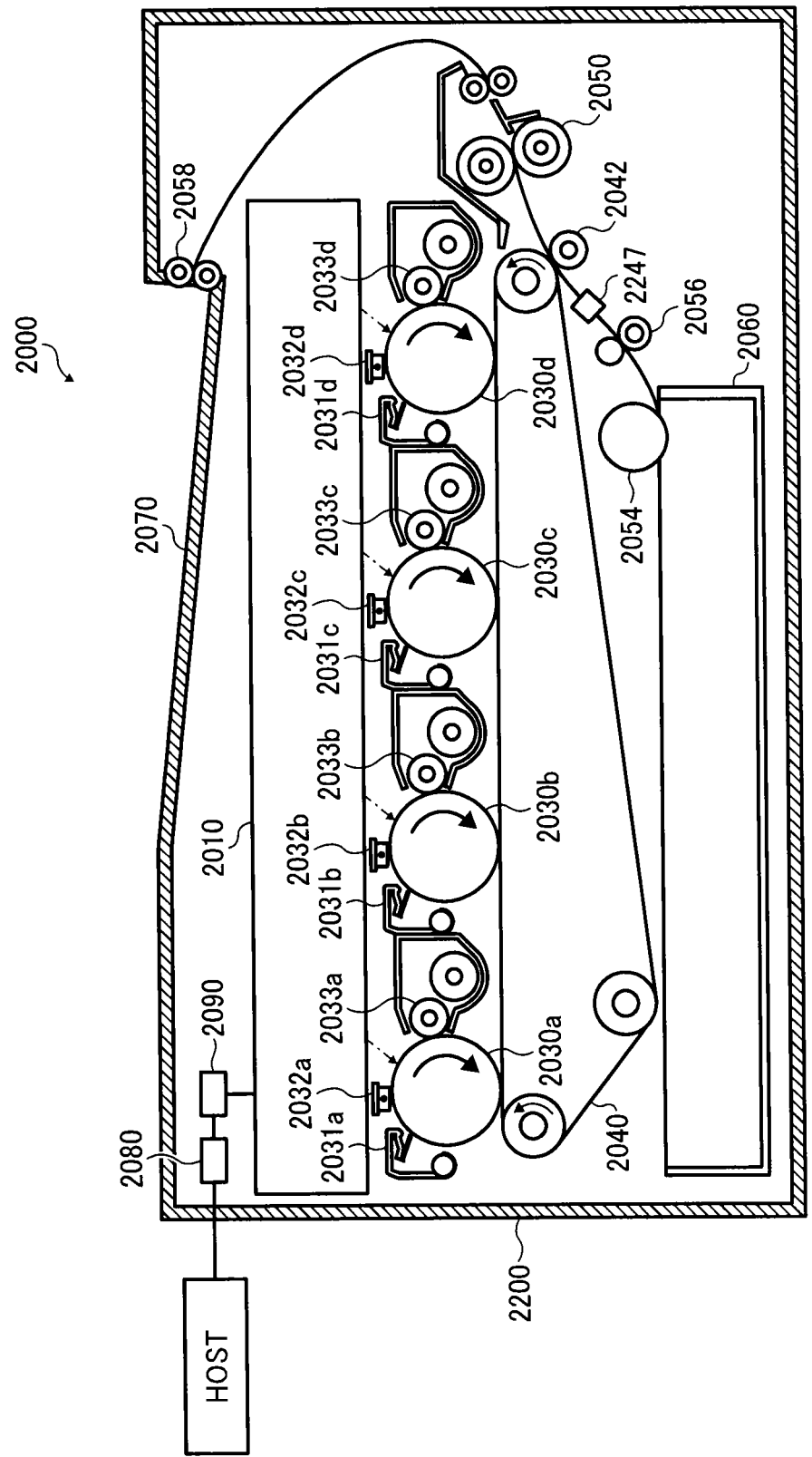
FIG. 1 is a diagram illustrating a schematic configuration of a color printer according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF THE INVENTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following, an embodiment of the present invention will be described with reference to FIGS. 1 to 14. FIG. 1 is a diagram illustrating a schematic configuration of a color printer 2000 as an image forming apparatus according to an embodiment of the present invention.

The color printer 2000 of FIG. 1 is a tandem-type multi-color printer that forms a full color image on a recording medium by superimposing four colors (black, cyan, magenta, and yellow) one above the other, and includes, an optical scanning device 2010, four photoconductor drums (2030a, 2030b, 2030c, 2030d), four cleaning units (2031a, 2031b, 2031c, 2031d), four charging units (2032a, 2032b, 2032c, 2032d), four developing rollers (2033a, 2033b, 2033c, 2033d), a transfer belt 2040, a transfer roller 2042, a fixing unit 2050, a paper feeding roller 2054, a pair of registration rollers 2056, a pair of paper ejection rollers 2058, a paper feeding tray 2060, a paper ejection tray 2070, a communication control unit 2080, a sensor device 2247, an operation panel, a printer control device 2090, and a printer housing 2200 that houses all these members, and so on.

The communication control unit 2080 controls bidirectional communication with a host (e.g., personal computer) via a network or the like.

The printer control device 2090 includes a central processing unit (CPU), a read-only memory (ROM), a random access memory (RAM) which is a work memory, and an analog-digital (AD) conversion circuit that converts an analog signal to digital signal, and so on. The ROM stores a program described using codes readable by the CPU, and various kinds of data for execution of the program. Further, the printer control device 2090 controls respective units in response to a request from the host, or transmits image data from the host to the optical scanning device 2010.

The operation panel includes a plurality of keys for an operator to execute various kinds of setting and various kinds of processing, and a display to display various kinds of information.

The photoconductor drum 2030*a*, charging unit 2032*a*, developing roller 2033*a*, and cleaning unit 2031*a* together constitute an image forming station (hereinafter conveniently referred to as "K-station") that forms a black image.

The photoconductor drum 2030*b*, charging unit 2032*b*, developing roller 2033*b*, and cleaning unit 2031*b* together constitute an image forming station (hereinafter conveniently referred to as "C-station") that forms a cyan image.

The photoconductor drum 2030*c*, charging unit 2032*c*, developing roller 2033*c*, and cleaning unit 2031*c* together constitute an image forming station (hereinafter conveniently referred to as "M-station") that forms a magenta image.

The photoconductor drum 2030*d*, charging unit 2032*d*, developing roller 2033*d*, and cleaning unit 2031*d* together constitute an image forming station (hereinafter conveniently referred to as "Y-station") that forms a yellow image.

All of the respective photoconductor drums include surfaces on which photosensitive layers are formed. Each of the photoconductor drums is rotated, by a rotating mechanism, in a direction indicated by an arrow shown in FIG. 1.

Each of the respective charging units uniformly charges the surface of the corresponding photoconductor drum.

The optical scanning device 2010 scans each charged surface of the corresponding photoconductor drum with light modulated per color based on multi-color image data from the printer control device 2090 (black image data, cyan image data, magenta image data, yellow image data). By this, a latent image corresponding to the image data is formed on the surface of each of the photoconductor drums. In other words, the surface of each of the photoconductor drums is a surface to be scanned. Further, each of the photoconductor drums is an image bearer. The latent image formed here is moved in a direction of the corresponding developing roller along with rotation of the photoconductor drum.

Toner from a corresponding toner cartridge is thinly and uniformly applied to a surface of each of the developing rollers along with rotation. Further, when the toner on the surface of each of the developing rollers contacts the surface of the corresponding photoconductor drum, the toner is transferred, and adheres only to a portion of the surface irradiated with light. More specifically, each of the developing rollers causes the toner to adhere to the latent image formed on the surface of the corresponding photoconductor drum to develop the same. Here, an image to which the toner adheres (toner image) is moved in a direction of the transfer belt 2040 along with rotation of the photoconductor drum.

The images of the respective yellow, magenta, cyan, and black toner are sequentially transferred onto the transfer belt 2040 at predetermined timing and then superimposed, thereby forming multi-color image.

Recording papers are stored in the paper feeding tray 2060. The paper feeding roller 2054 is disposed in the vicinity of the paper feeding tray 2060, and the paper feeding roller 2054 picks out the recording paper one by one from the paper feeding tray 2060. The recording paper is sent to a nip formed between the transfer belt 2040 and the transfer roller 2042 at predetermined timing. By this, the toner image on the transfer belt 2040 is transferred to the recording paper. Here, the recording paper to which the image has been transferred is sent to the fixing unit 2050.

In the fixing unit 2050, heat and pressure are applied to the recording paper, thereby fixing the toner onto the recording paper. Here, the recording paper fixed with the toner is sent to the paper ejection tray 2070 via the paper ejection roller 2058, and sequentially piled up on the paper ejection tray 2070.

Each of the cleaning units removes the toner remaining on the surface of the corresponding photoconductor drum (residual toner). The surface of the photoconductor drum from which the residual toner has been removed returns to a position facing the corresponding charging unit again.

Meanwhile, as for the recording papers of a plurality of brands that can be supported by the color printer 2000, optimal development conditions and transfer conditions at the respective stations are preliminarily determined for each of the brands of the recording paper before shipping such as during the process of adjusting, and the determination results are stored in the ROM of the printer control device 2090 as "Developing/Transfer Table".

The sensor device 2247 is disposed on a conveyance path of the recording paper picked out from the paper feeding tray 2060, and used to discriminate a brand of the recording paper.

Figure 2:
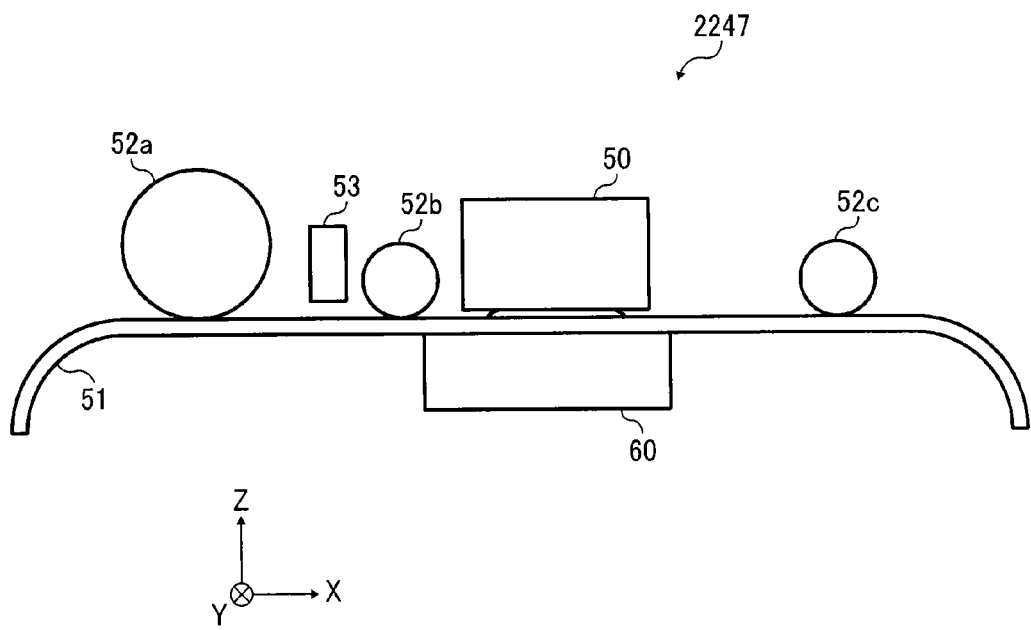
FIG. 2 is a diagram illustrating a configuration of a sensor device that may be provided in the printer in FIG. 1 according to an embodiment of the present invention.
Figure 3:
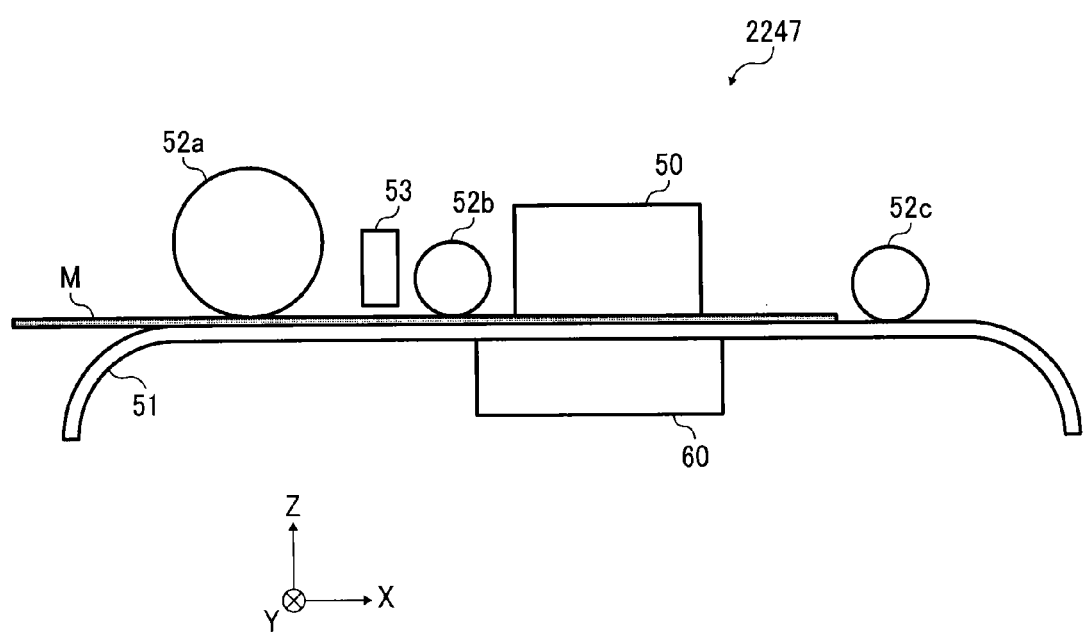
FIG. 3 is a diagram illustrating a relation between the sensor device of FIG. 2 and a recording paper according the embodiment of the present invention.
Figure 4:
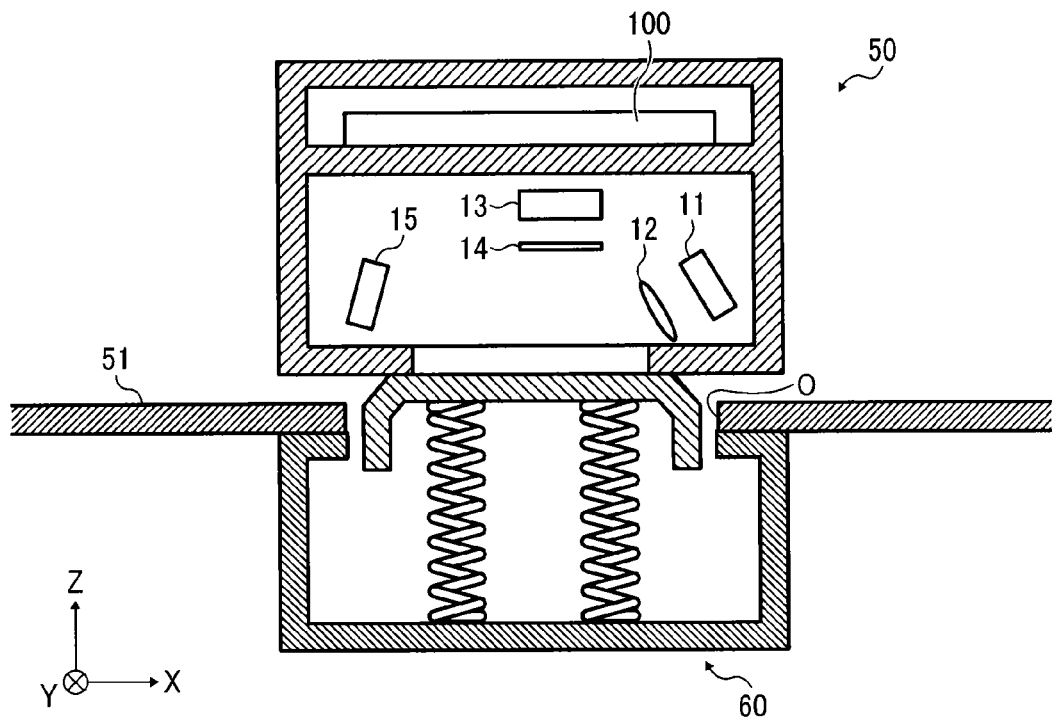
FIG. 4 is a diagram illustrating a positional relation between an optical sensor and a pressing mechanism of the sensor device of FIG. 2 according to the embodiment of the present invention.

The sensor device 2247 includes, as illustrated in an example of FIGS. 2 and 3, an optical sensor 50, a paper passing guide 51, a plurality of guide rollers (52*a* to 52*c*), a paper sensor 53, a pressing mechanism 60, and a metallic or hard plastic holder to hold these components.

Note that a direction orthogonal to a surface of the recording paper is defined as a Z-axis direction, and a direction in which the recording paper is moved is defined as a +X-direction in an XYZ three-dimensional orthogonal coordinate system.

The paper passing guide 51 is a member made of metal or hard plastic. As illustrated in FIG. 3, a recording paper M is moved in the +X-direction on a +Z-side surface of the paper passing guide 51. Further, the paper passing guide 51 has an opening at a portion between the optical sensor 50 and the pressing mechanism 60 (refer to "O" in FIG. 4).

Each of the guide rollers 52*a* to 52*c* is disposed on the +Z side of the paper passing guide 51, and the recording paper M is prevented from floating from the paper passing guide 51 by pressing the recording paper M against the +Z-side surface of the paper passing guide 51. Each of the guide rollers 52*a* to 52*c* is, for example, formed by applying rubber-lining on a surface of a metallic shaft.

The paper sensor 53 is disposed on the +Z side of the paper passing guide 51 and on −X side of the optical sensor 50. Here, the paper sensor 53 outputs, to the printer control device 2090, signals of two values: H (high) level when the recording paper M is positioned on −Z side of the paper sensor 53 (FIG. 3), and L (low) level in the absence of the recording paper M (FIG. 2). In other words, the paper sensor 53 detects presence of the recording paper M.

For the paper sensor 53, a photo-reflector that determines presence and a position of an object by irradiating the object with light and detecting the light reflected, an ultrasonic sensor that detects presence of an object by transmitting ultrasonic wave to the object from a wave transmitter and receiving a reflected wave at a waver receiver, a cantilever displacement sensor, etc. can be used.

The pressing mechanism 60 is disposed at a position facing the optical sensor 50, interposing the paper passing guide 51. The pressing mechanism 60 presses the recording paper M against the optical sensor 50 via the opening of the paper passing guide 51.

Figure 5:
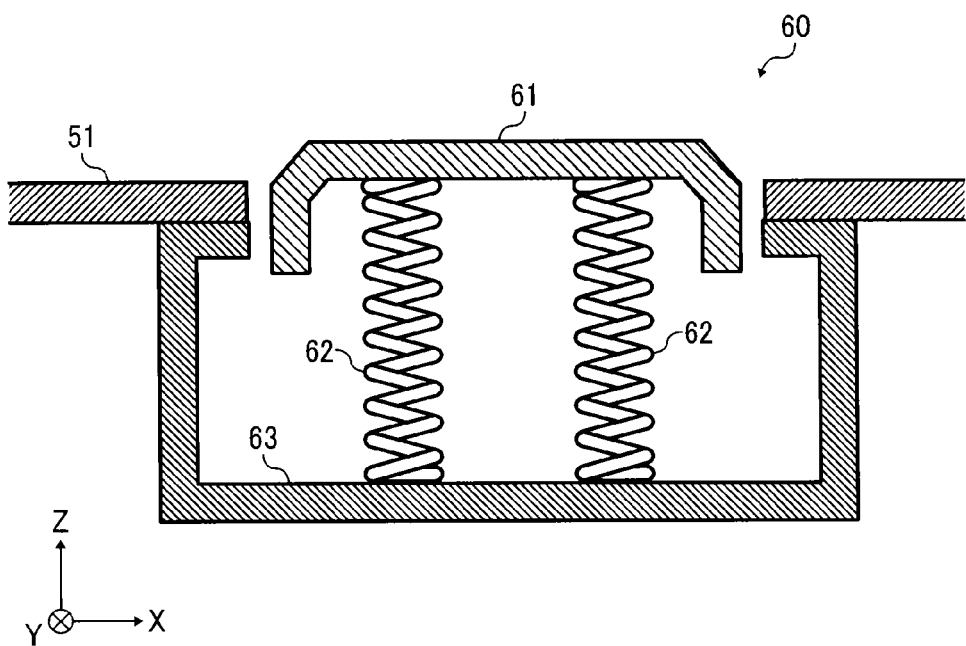
FIG. 5 is a diagram illustrating a configuration of the pressing mechanism of the sensor device of FIG. 2 according to the embodiment of the present invention.
Figure 6:
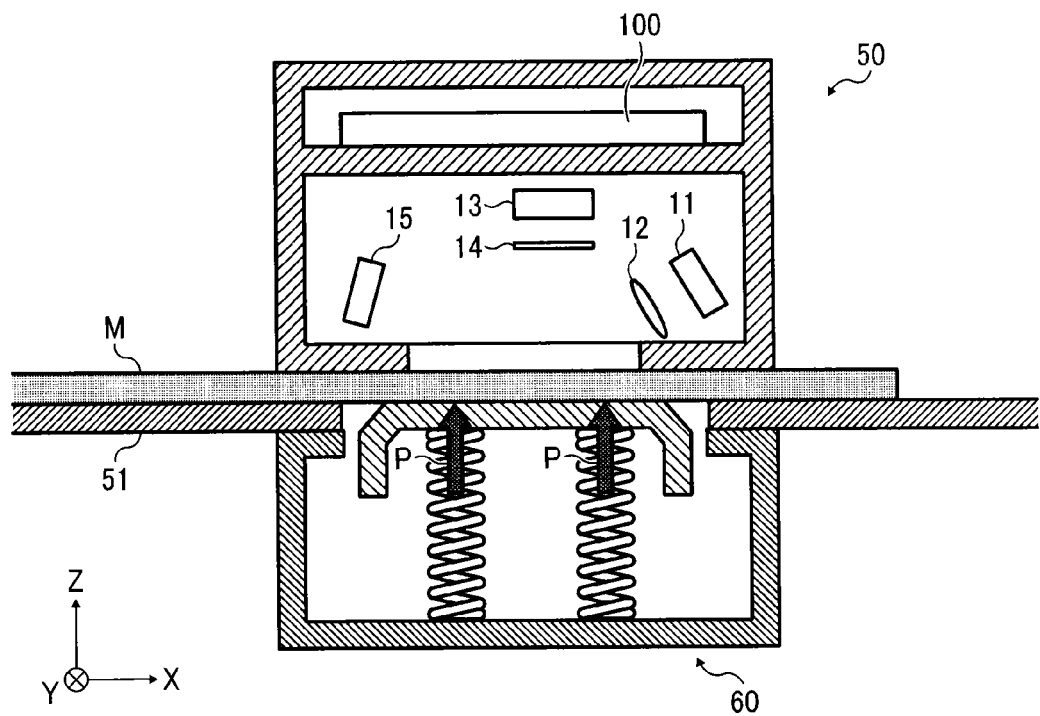
FIG. 6 is a diagram illustrating a function of the pressing mechanism of FIG. 5 according to the embodiment of the present invention.

The pressing mechanism 60 includes, as illustrated in an example of FIG. 5, a pressing plate 61, a plurality of springs 62, a case 63. The plurality of springs 62 has a −Z-side end portion fixed to the case 63, and a +Z-side end portion fixed to the pressing plate 61. Further, when the recording paper M is moved to the −Z side of the optical sensor 50, pressurizing force P in a +Z direction is applied to the pressing plate 61 by restoring force of the plurality of springs 62, and the recording paper M is pressed against the optical sensor 50 by the pressing plate 61 (refer to FIG. 6).

The optical sensor 50 irradiates the recording paper M with light, and measures a reflection light amount thereof.

Figure 7:
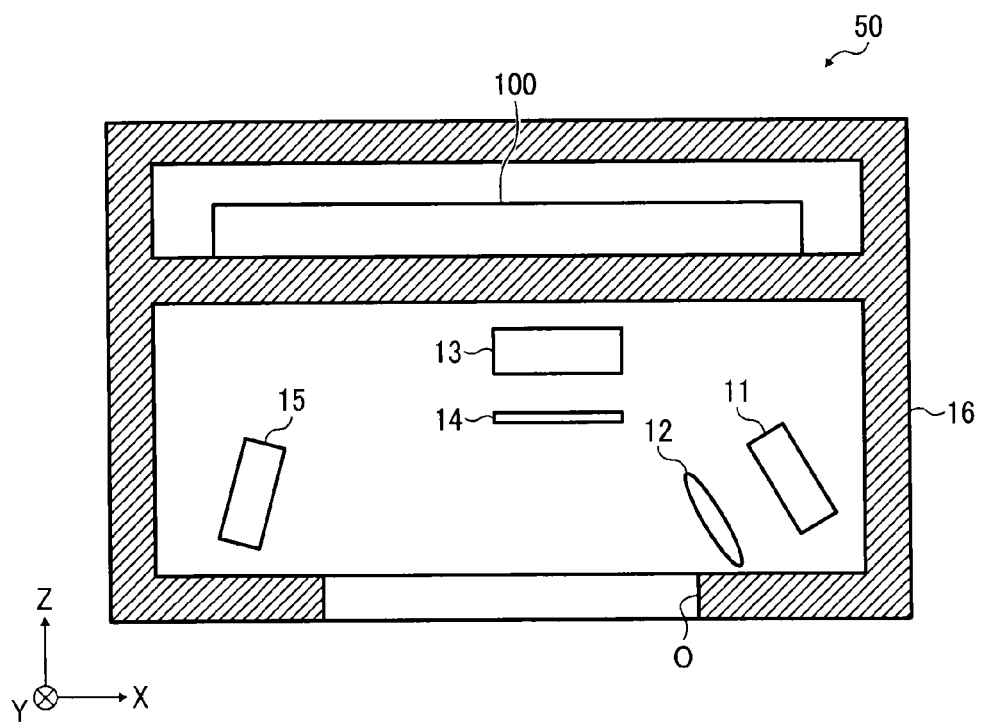
FIG. 7 is a diagram illustrating the optical sensor of the sensor device of FIG. 2 according to the embodiment of the present invention.
Figure 8:
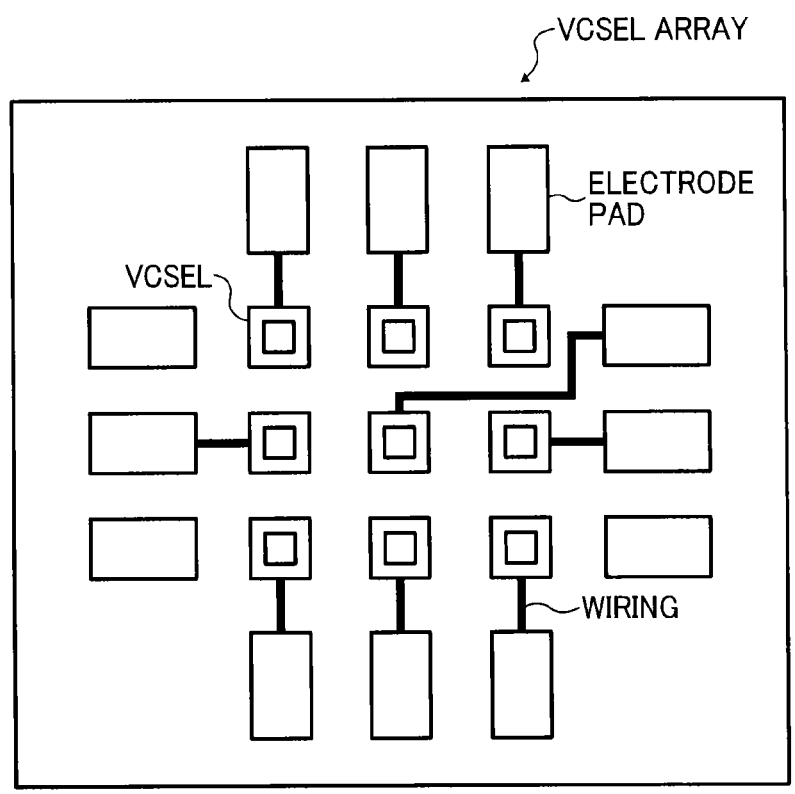
FIG. 8 is a diagram illustrating a vertical cavity surface emitting lasers array (VCSEL array) of the optical sensor according to the embodiment of the present invention.
Figure 9:
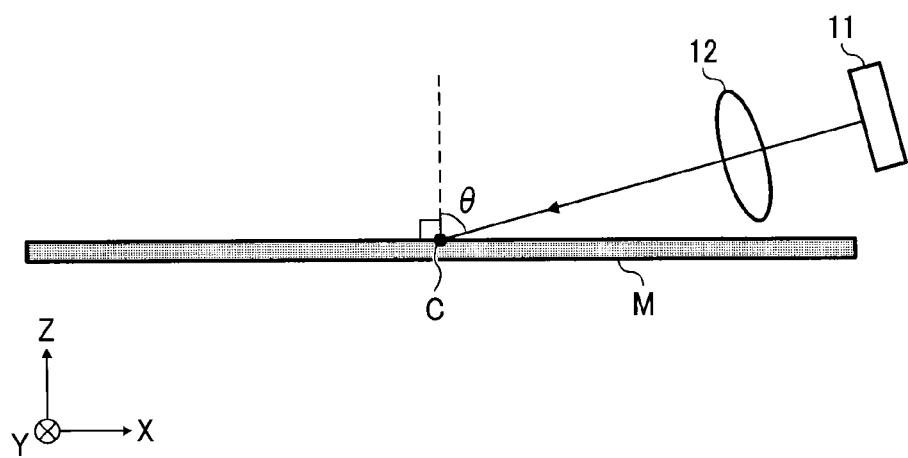
FIG. 9 is a diagram illustrating an incidence angle of incident light to the recording paper according to the embodiment of the present invention.

The optical sensor 50 includes, as illustrated in an example of FIG. 7, a light source 11, a collimator lens 12, two light receivers (13, 15), a polarization filter 14, a controller 100, and a dark box 16 to house these components.

The dark box 16 is applied with surface treatment to reduce influence of ambient light and stray light, and in the case where the dark box is made of metal, for example, a box made of aluminum with black colored alumite treatment may be used, and in the case where the dark box is made of resin, a black color box may be used.

The light source 11 includes a plurality of light emitting members. The respective light emitting members are VCSEL (Vertical Cavity Surface Emitting Laser) formed on a same substrate. In other words, the light source 11 includes the VCSEL array. Here, as illustrated in an example of FIG. 8, nine VCSELs are arrayed two-dimensionally.

The light source 11 is disposed in such a manner that the recording paper M is irradiated with S-polarization. Further, an incidence angle θ of a light flux to the recording paper M from the light source 11 is 80° (refer to FIG. 9).

The collimator lens 12 is disposed on an optical path of the light flux emitted from the light source 11, and the light flux is formed of substantially parallel light. The light flux via the collimator lens 12 illuminates the recording paper M, passing through an opening O provided at the dark box 16 (refer to FIG. 7). Note that hereinafter a center of illumination area on a surface of the recording paper M will be abbreviated as "illumination center (C)". Further, the light flux via the collimator lens 12 will be also referred to as "irradiation light".

By the way, when the light enters an interface of medium, a surface including an incident light ray and a normal line on the interface formed at an incident point is referred to as "incidence plane". Accordingly, in the case where the incident light is formed of a plurality of light rays, the incidence plane exists for each of the light rays. But, here, note that an incidence plane of the light ray that enters the illumination center (C) will be conveniently referred to as the incidence plane on the recording paper M. In other words, a surface including the illumination center (C) and parallel to an XZ-surface is the incidence plane on the recording paper M.

The polarization filter 14 is disposed on the +Z side of the illumination center (C). The polarization filter 14 transmits P-polarization while blocking the S-polarization. Note that a polarization beam splitter having the same functions may also be used instead of the polarization filter 14.

In this disclosure, the light source 11 and the collimator lens 12 may be collectively referred to as an irradiation unit.

Figure 10:
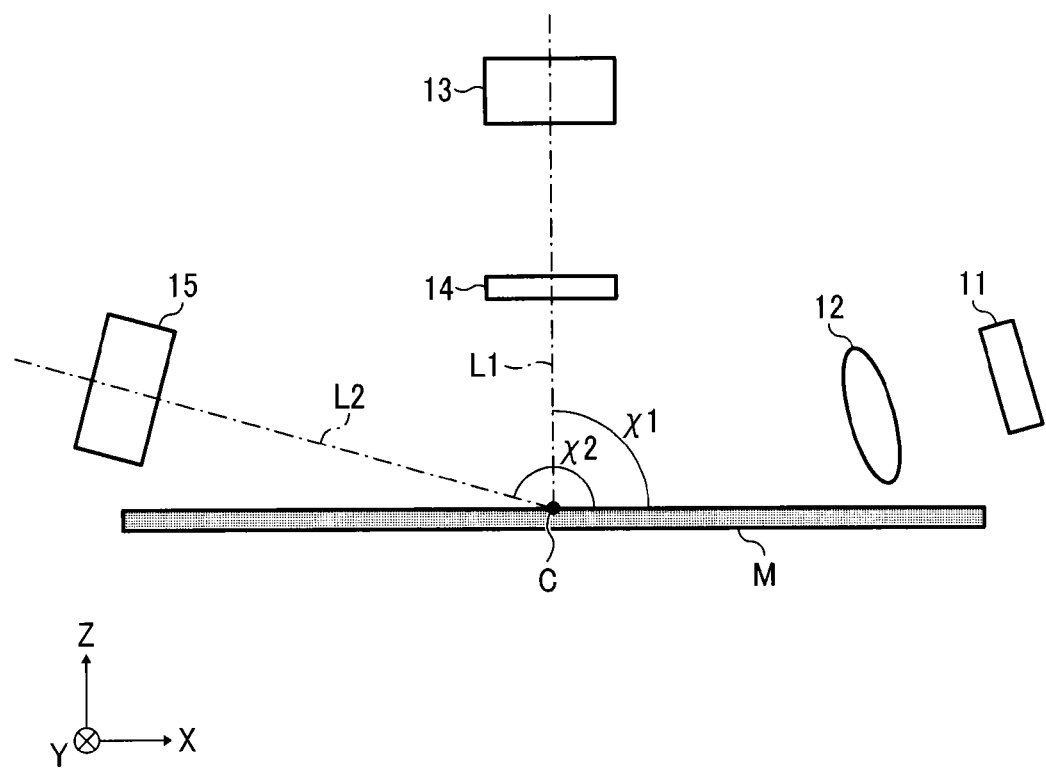
FIG. 10 is a diagram illustrating arrangement of two light receivers of the optical sensor of FIG. 7 according to an embodiment of the present invention.
Figure 11A:
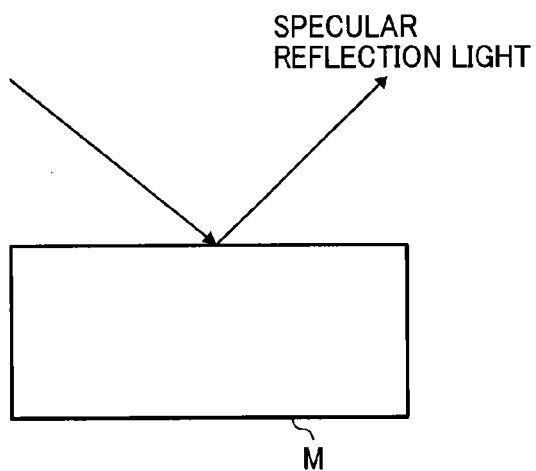
FIG. 11A is a diagram illustrating surface specular reflection light.
Figure 11B:
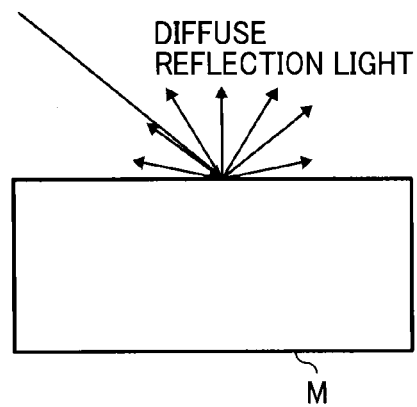
FIG. 11B is a diagram illustrating surface diffuse reflection light.
Figure 11C:
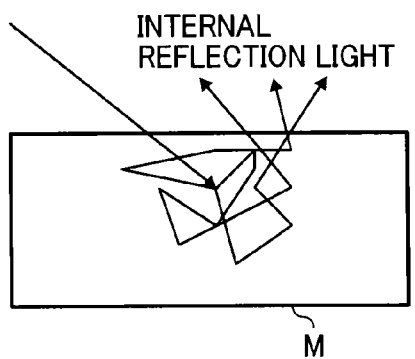
FIG. 11C is a diagram illustrating internal reflection light according to the embodiment of the present invention.
Figure 12:
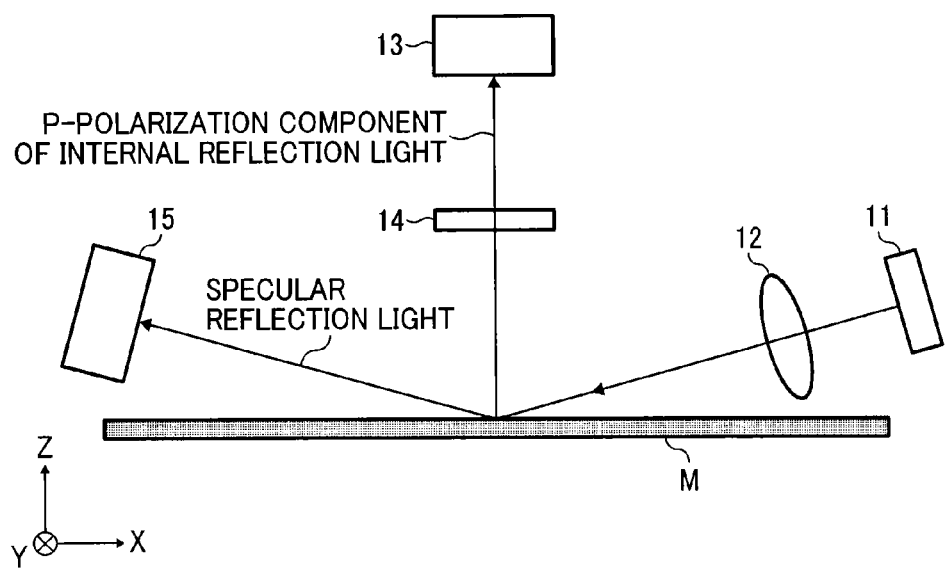
FIG. 12 is a diagram illustrating light received in each light receiver of the optical sensor of FIG. 7 according to the embodiment of the present invention.

The light receiver 13 is disposed on the +Z side of the polarization filter 14. Here, as illustrated in FIG. 10, an angle ψ1 formed between the surface of the recording paper M and a line L1 connecting the illumination center (C) with centers of the polarization filter 14 and the light receiver 13 is 90°.

The light receiver 15 is disposed on a +X side of the illumination center (C) relative to an X-axis direction. Further, an angle ψ2 formed between the surface of the recording paper M and a line L2 connecting the illumination center (C) with a center of the light receiver 15 is 170°.

A center of the light source 11, the illumination center (C), center of the polarization filter 14, center of light receiver 13, and center of the light receiver 15 are located substantially on a same plane.

By the way, reflection light from the recording paper when the recording paper is irradiated can be considered to have classifications of reflection light reflected at the surface of the recording paper, and reflection light reflected at the inside of the recording paper. Further, reflection light reflected at the surface of the recording paper can be considered to have classifications of reflection light regularly reflected, and reflection light diffused and reflected. Hereinafter, the reflection light regularly reflected at a surface of a recording paper M will be also referred to as "surface specular reflection light" and the reflection light diffused and reflected will be also referred to as "surface diffuse reflection light" for sake of convenience (refer to FIGS. 11A and 11B).

A surface of the recording paper M includes a flat portion and an inclined portion, and smoothness of the surface of the recording paper M is determined by a ratio between the portions. The light reflected at the flat portion becomes the surface specular reflection light, and the light reflected at the inclined portion becomes the surface diffuse reflection light. The surface diffuse reflection light is reflection light completely scattered and reflected, and a reflecting direction thereof is deemed isotropic. Further, the higher smoothness of the surface of the recording paper M is, the more a light amount of the surface specular reflection light from the recording paper M is increased.

On the other hand, in the case where the recording paper M is a regular printing paper, only diffuse reflection light remains because the reflection light from the inside of the recording paper M is multiply scattered in the fibers inside thereof. In the following, the reflection light from the inside of the recording paper M will be also conveniently referred to as "internal reflection light" (refer to FIG. 11C). The internal reflection light is also the reflection light completely scattered and reflected same as the surface diffuse reflection light, and the reflecting direction thereof can be deemed isotropic.

Polarization directions of the surface specular reflection light and the surface diffuse reflection light directed to the light receiver is same as a polarization direction of the incident light. By the way, in order to rotate the polarization direction on the surface of the recording paper M, the incident light is needed to be reflected at a surface tilted in a rotational direction relative to an advancing direction of the incident light. Here, since the center of the light source, the illumination center (C) and the centers of the respective light receivers are on the same plane, the reflection light having the polarization direction rotated on the surface of the recording paper M is not reflected in a direction of any light receiver.

On the other hand, the polarization direction of the internal reflection light is rotated relative to the polarization direction of the incident light. The reason can be considered that the internal reflection light is transmissive inside the fiber and is optically rotated while being multiply scattered, and the polarization direction is rotated.

The surface diffuse reflection light and the internal reflection light enter the polarization filter 14. The surface diffuse reflection light is blocked at the polarization filter 14 because the polarization direction of the surface diffuse reflection light is the S-polarization having the same polarization direction as the incident light. On the other hand, the polarization direction of the internal reflection light is rotated relative to the polarization direction of the incident light. Therefore, a P-polarization component included in the internal reflection light is transmissive through the polarization filter 14. In other words, the P-polarization component included in the internal reflection light is received at the light receiver 13 (refer to FIG. 12).

JP-2012-127937-A recites that a light amount of the P-polarization component included in the internal reflection light is correlated to thickness and density of the recording paper. The reason is that the light amount of the P-polarization component depends on a path length at the time of passing through the inside of the fibers in the recording paper.

The surface specular reflection light, and small portions of the surface diffuse reflection light and internal reflection light enter the light receiver 15. In other words, the surface specular reflection light mainly enters the light receiver 15.

The light receiver 13 and the light receiver 15 respectively output, to the printer control device 2090, electric signals (photoelectric conversion signals) corresponding to received light amounts. Note that, when the recording paper is irradiated with the light flux from the light source 11, a signal level of an output signal from the light receiver 13 is referred to as "S1" and a signal level of an output signal from the light receiver 15 is referred to as "S2" in the following.

Here, as for the recording papers of a plurality of brands that can be supported by the color printer 2000, values of S1 and S2 are preliminarily measured per brand of the recording papers before shipping such as during the process of adjustment, and the measurement results are stored in the ROM of the printer control device 2090 as "Recording Paper Discrimination Table".

The controller 100 controls operation of the sensor device 2247. The controller 100 includes a microcontroller, a memory, a logic circuit, an AD converter that applies AD conversion to output from the plurality of light receivers. The controller 100 turns on the plurality of VCSELs at the light source 11 in response to a request from the printer control device 2090 received via a cable, and transmits the measurement results of the received light amounts at the plurality of light receivers, calculated values using the measurement results, or the like to the printer control device 2090 via the cable.

Paper type discrimination processing for the recording paper is executed, for example, when the color printer 2000 is powered on, when the recording paper is supplied to the paper feeding tray 2060, or when a command is given from the operation panel.

In the following, operation of discriminating paper type of recording paper and controlling the light source 11 will be described.

1. The printer control device 2090 transmits a request to start the paper type discrimination processing to the sensor device 2247 when the color printer 2000 is powered on, when the recording paper is supplied to the paper feeding tray 2060, or when a command is given from the operation panel.

2. The controller 100 of the sensor device 2247 starts measurement preparation upon receipt of the request to start the paper type discrimination processing.

3. The controller 100 transmits a notification of completion of measurement preparation to the printer control device 2090 upon completion of measurement preparation.

4. The printer control device 2090 picks out one piece of recording paper from the paper feeding tray 2060 and sends out the same to a conveyance path upon receipt of the notification of completion of measurement preparation.

5. When the recording paper is moved on the conveyance path and reaches the sensor device 2247, the recording paper is pressed against the paper passing guide 51 by the guide roller 52a.

6. The recording paper is moved on the +Z-side surface of the paper passing guide 51 without floating.

7. When a +X-side end portion of the recording paper is located on the −Z side of the paper sensor 53, output from the paper sensor 53 is changed to H (high) level from L (low) level.

8. When output from the paper sensor 53 is changed to H (high) level from L (low) level, the controller 100 turns on the plurality of VCSELs at the light source 11 after a preset time passes. The preset time is a period from when output from the paper sensor 53 is changed to H (high) level from L (low) level until when the opening O of the dark box 16 is closed with the recording paper, and the period is calculated based on a moving distance and a moving speed of the recording paper at the time.

9. The controller 100 applies AD conversion to output from the light receiver 13 and light receiver 15 to acquire the received light amounts at the respective light receivers. The controller 100 repeatedly performs measurement of the received light amounts at the respective light receivers at predetermined time intervals.

10. When the −X-side end portion of the recording paper is located on the −Z-side of the paper sensor 53, output from the paper sensor 53 is changed to L (low) level from H (high) level.

11. When the output from the paper sensor 53 is changed to L (low) level from H (high) level, the controller 100 finishes measuring the received light amounts at the respective light receivers 13 and 15, and turns off the plurality of VCSELs at the light source 11.

12. The controller 100 acquires a value of S1 from a measurement result of the received light amount at the light receiver 13, and acquires a value of S2 from a measurement result of the received light amount at the light receiver 15. The controller 100 transmits the acquired values of S1 and S2 to the printer control device 2090.

13. The printer control device 2090 refers to the recording paper discrimination table upon receipt of the values of S1 and S2, and identifies a brand of the recording paper from the acquired values of S1 and S2.

Figure 13:
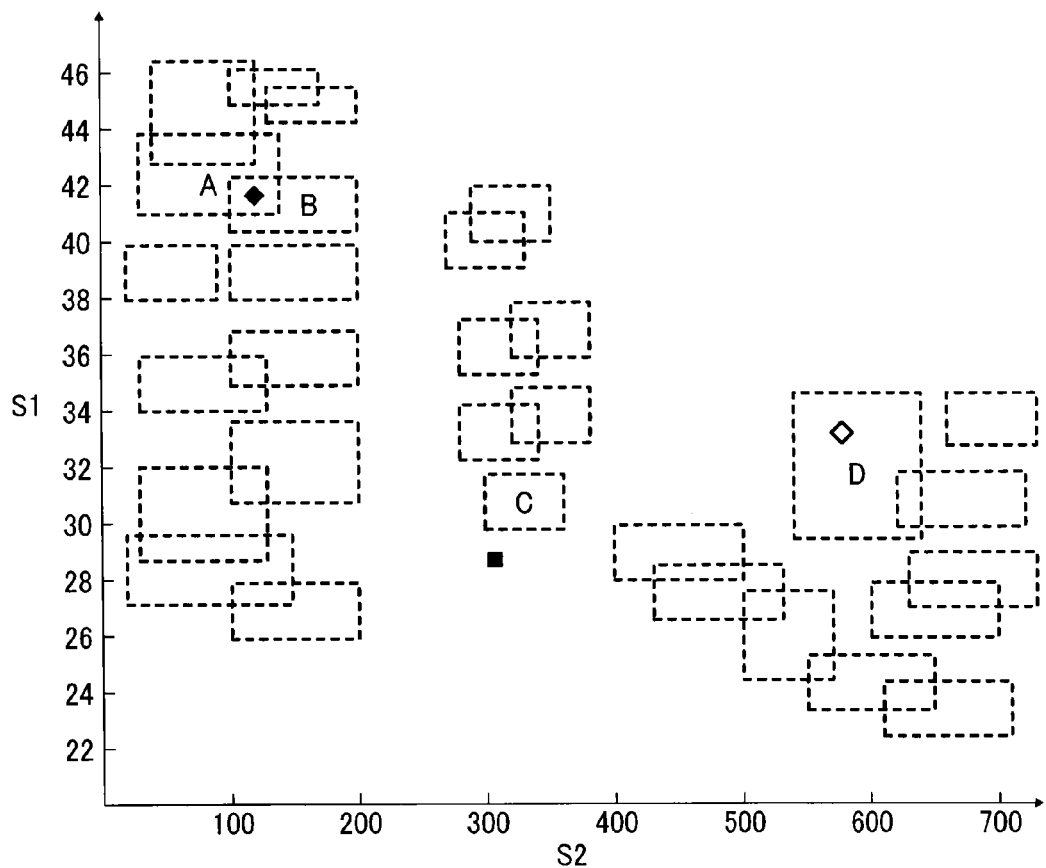
FIG. 13 is a graph illustrating a relation between signals output from the light receivers of the sensor device and brands of the recording paper according to the embodiment of the present invention.
Figure 14:
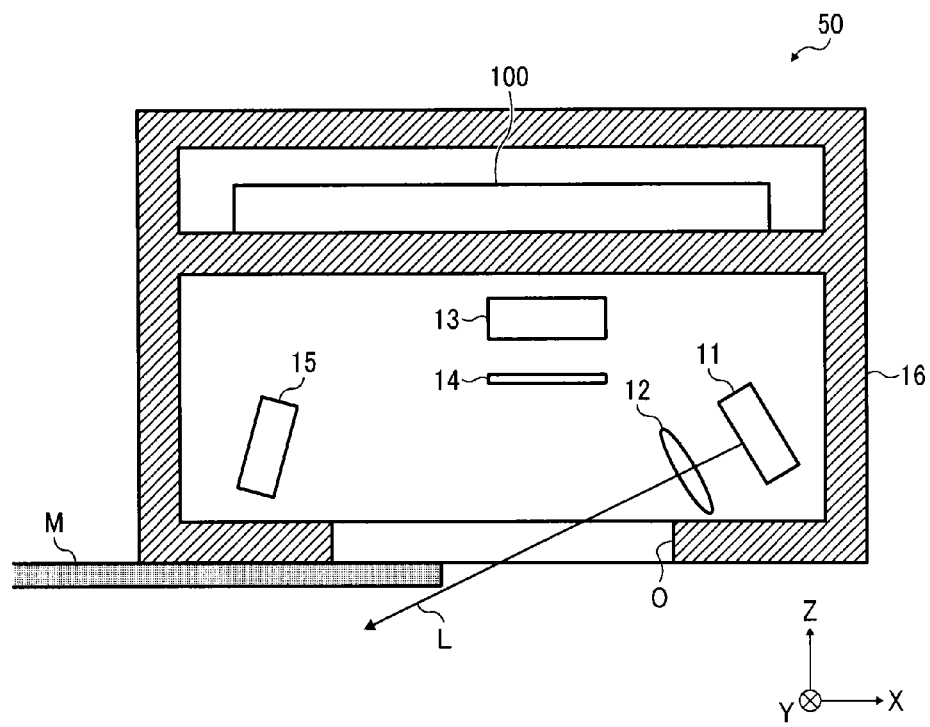
FIG. 14 is a diagram illustrating light that leaks outside the sensor device of FIG. 2.

In FIG. 13, measurement values of S1 and S2 are provided in regard to thirty brands of recording papers sold in Japan. Note that a frame in FIG. 13 indicates a variation range of the same brand.

For example, when the measurement values of S1 and S2 are "◇", the brand is identified as brand D. Also, when the measurement values of S1 and S2 are "■", the brand is identified as brand C to which the measurement values are closest. Further, when the measurement values of S1 and S2 are "◆", the brand is identified as either brand A or B. In this case, for example, a difference between an average value and the measurement values of the brand A, and a difference between an average value and the measurement values of the brand B are calculated, and the one showing a smaller calculation result is identified as the brand. Or, variation including the measurement values may be re-calculated by assuming that the brand is the brand A, and also variation including the measurement values may be re-calculated by assuming that the brand is the brand B, and then the brand having smaller recalculated variation may be selected.

14. The printer control device 2090 saves the identified brand of the recording paper in the RAM.

When the printer control device 2090 reads out the brand of the recording paper saved in the RAM upon receipt of a print job request from a user, the printer control device 2090 acquires optimal development conditions and transfer conditions for the brand of the recording paper from the "Developing/Transfer Table".

Further, the printer control device 2090 controls, for example, a developing device and a transfer device at each of the stations in accordance with the optimal development conditions and the transfer conditions. For example, transfer voltage and a toner amount are controlled. A high-quality image is formed on the recording paper by this.

Meanwhile, there may be a case where abnormal conveyance of the recording paper occurs and the output from the paper sensor 53 is kept at H (high) level. According to the present embodiment, when a predetermined time passes after output from the paper sensor 53 is changed to H (high) level from L (low) level, the controller 100 is set so as to turn off the light source 11 regardless of output from the paper sensor 53. The predetermined time is a period from when the output for the paper sensor 53 is changed to H (high) level from L (low) level in a normal state until when the recording paper passes the optical sensor 50, and the period is calculated from the moving distance and the moving time of the recording paper at the time.

Therefore, even in the case where the output from the paper sensor 53 is kept at H (high) level due to the abnormal conveyance or the like, the controller 100 determines that the recording paper has passed the optical sensor 50 when the predetermined time passes after output from the paper sensor 53 is changed to H (high) level from L (low) level, and the controller 100 turns off the light source 11 and further notifies the printer control device 2090 of occurrence of abnormality.

Additionally, even in the normal state, measuring the received light amounts at the respective light receivers may be finished and the plurality of VCSELs at the light source 11 may be turned off when the predetermined time passes after the output from the paper sensor 53 is changed to H (high) level from L (low) level without monitoring the output from the paper sensor 53 being changed to L (low) level from H (high) level.

As described above, the sensor device 2247 according to the present embodiment includes the optical sensor 50, paper passing guide 51, plurality of guide rollers (52a to 52c), paper sensor 53, pressing mechanism 60, and so on.

The optical sensor 50 includes the light source 11, collimator lens 12, two light receivers (13, 15), polarization filter 14, controller 100, and so on.

Further, the irradiation system including the light source 11 and the collimator lens 12 irradiates the recording paper, namely, an object with the S-polarization from a direction tilted in the Z-axis direction. The light receiver 15 is disposed on the optical path of light (surface specular reflection light) emitted from the irradiation system and regularly reflected at the recording paper. The polarization filter 14 and the light receiver 13 are disposed on the optical path of light diffused and reflected in the normal direction of the surface of the recording paper. The polarization filter 14 transmits the P-polarization component, and the light receiver 13 receives the light transmissive through the polarization filter 14 (P-polarization component included in the internal reflection light). Further, the paper sensor 53 detects presence of the recording paper.

The controller 100 turns on the plurality of VCSELs at the light source 11 based on timing when "presence of recording paper" is detected by the paper sensor 53. Further, the controller 100 turns off the plurality of VCSELs at the light source 11 when "absence of recording paper" is detected by the paper sensor 53.

By the way, the opening O of the dark box 16 is hermetically closed with the pressing plate 61, but there may be possibility that a gap is formed due to mixture of a foreign matter, deform of a component, an accidental error at the time of assembly, etc. Since the opening O of the dark box 16 is exposed outside, in the case where such a gap is formed, a laser beam leaks outside (refer to FIG. 14) via the opening O of the dark box 16 and may affect an operator's eye when the light source 11 is turned on while the opening O of the dark box 16 is not closed with the recording paper. However, according to the present embodiment, output from the paper sensor 53 is utilized as one of control conditions of the light source 11. Therefore, the light source 11 can be turned on only when the opening O of the dark box 16 is closed with the recording paper. As a result, the laser beam can be prevented from leaking outside although the opening O is exposed outside. Further, life of the light source 11 can be prolonged and power consumption can be reduced.

Meanwhile, the reasons why the sensor device cannot be configured not to leak the laser beam outside are as follows: (1) an opening for the irradiation light to pass through is necessary in order to irradiate the recording paper; (2) an outer shape will be upsized in a structure where the sensor device including the recording paper is hermetically closed; (3) downsizing of the recording paper is necessary in order to suppress upsizing of the sensor device, but that is complicated. Further, even though the sensor device has the hermetically closed structure, there may be possibility that a gap is formed due to mixture of a foreign matter, deform of a component at the time of assembly, an accidental error at the time of assembly, etc.

Additionally, the controller 100 discriminates a brand of a recording paper based on output from the plurality of the light receivers.

In this case, the light amount of P-polarization component included in the internal reflection light is detected, thereby achieving to separate the reflection light emitted from the inside of the recording paper although such separation is difficult in the related art because of weakness of the reflection light. The reflection light from the inside of the recording paper includes information related to an internal state of the recording paper. Therefore, a level of discrimination of the paper types can be improved up to a level of a brand which could be hardly discriminated in the related art.

Accordingly, the controller 100 can discriminate the types of recording papers with higher accuracy than the related art.

Further, since the light source 11 includes the VCSEL array, the polarization filter is not needed to change the irradiation light to linear polarization. Moreover, downsizing of the sensor device 2247 and cost reduction can be achieved because the irradiation light can be easily changed to parallel light and further a downsized light source including the plurality of VCSELs can be implemented.

Furthermore, in the case of using the VCSEL array, high-density integration that is difficult with a light-emitting diode (LED) or the like used in the related art can be achieved. Accordingly, all of the laser beams can be concentrated in the vicinity of an optical axis of the collimator lens. Therefore, multiple light fluxes can be directed in substantially parallel by setting the incidence angle constant. As a result, a collimator optical system can be easily implemented.

Further, since the light source 11 includes the plurality of VCSELs, the light amount of the P-polarization component included in the internal reflection light can be increased by turning on all of the VCSELs at the same time.

Moreover, since the light source 11 includes the plurality of VCSELs, a contrast ratio of a speckle pattern of the reflection light can be reduced and accuracy of discrimination can be improved by turning on the plurality of VCSELs at the same time, compared to a case where only one VCSEL is turned on.

Furthermore, since the VCSEL array is used, stable irradiation with the linear polarization can be achieved. By this, the light amount of the P-polarization component included in the internal reflection light can be detected with high accuracy.

Additionally, since the color printer 2000 according to the present embodiment includes the sensor device 2247, a high-quality image can be formed as a result. Further, botheration of manual setting and printing failure due to a setting mistake in the related art can be resolved.

Meanwhile, according to the above embodiment, the case where the light to irradiate the recording paper is the S-polarization in the optical sensor has been described, but not limited thereto, the light to irradiate the recording paper may be the P-polarization. However, in this case, a polarization filter that transmits the S-polarization is used instead of the polarization filter 14.

Further, according to the above embodiment, an interval of a part of the plurality of the VCSELs in the VCSEL array may be different from an interval of other parts thereof.

Moreover, according to the above embodiment, the case where the paper sensor 53 outputs a signal of H (high) level in the presence of a recording paper M, and the paper sensor 53 outputs a signal of L (low) level in the absence of the recording paper M has been described. But, not limited thereto, the paper sensor 53 may output the signal of L (low) level in the presence of the recording paper M, and may output the signal of H (high) level in the absence of the recording paper M. However, in this case, the L (low) level and H (high) level become reversed in the above-described paper type discrimination processing and control method for the light source 11.

By the way, in the case where discrimination may be erroneous due to influence of ambient light and stray light, the number of the light receivers may be increased.

Further, according to the above embodiment, the case of having one paper feeding tray has been described, but not limited thereto, the number of paper feeding trays may be plural.

Moreover, according to the above embodiment, the case where the number of paper sensors is one, but not limited thereto, the number of paper sensors can be plural.

Figure 15:
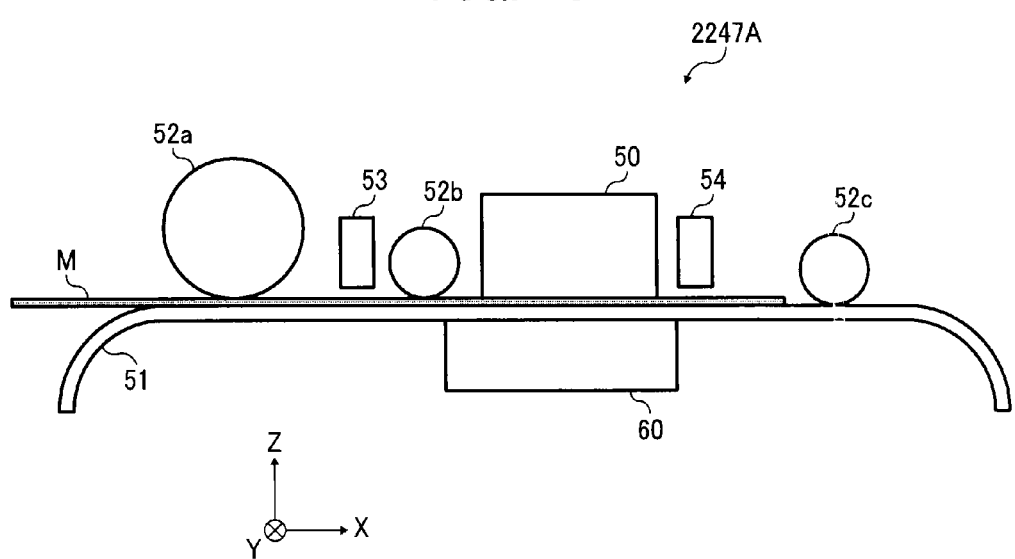
FIG. 15 is a diagram illustrating a configuration of a sensor device that may be provided in the printer in FIG. 1 according to an embodiment of the present invention.
Figure 16:
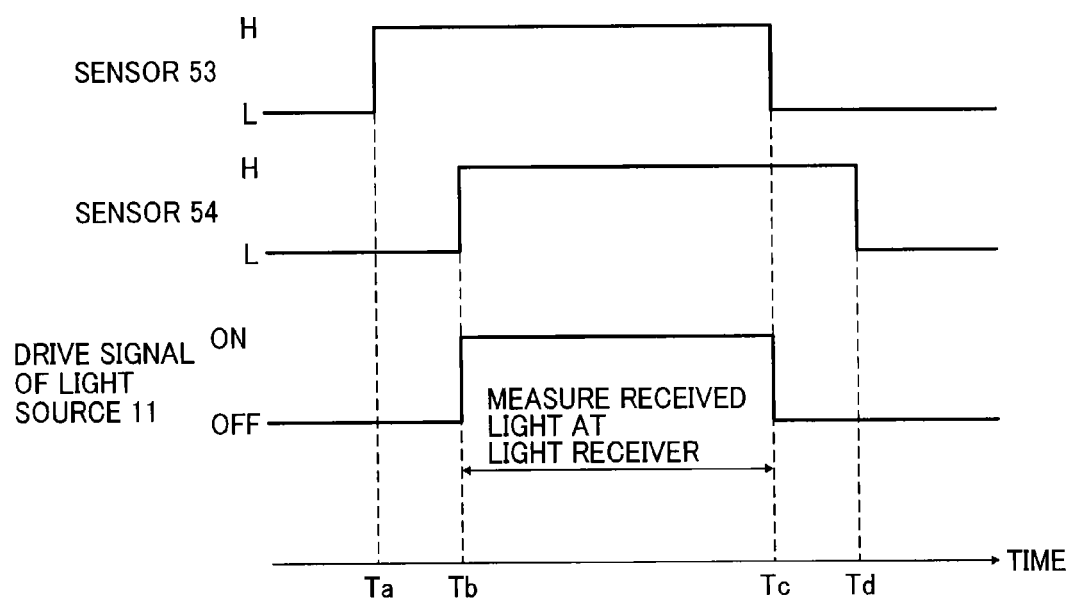
FIG. 16 is a timing chart for output from each paper sensor and a drive signal of a light source of the sensor device of FIG. 15, according to the embodiment of the present invention.

Referring now to FIGS. 15 and 16, a sensor device 2247A including two paper sensors (53, 54) is described according to an example embodiment of the present invention. Note that here the paper sensor 53 is referred to as a first paper sensor 53 and the paper sensor 54 is referred to as a second paper sensor 54 for sake of convenience.

The second paper sensor 54 is disposed on a +Z side of the paper passing guide 51 and a +X side of the optical sensor 50. Here, the second paper sensor 54 outputs, to a printer control device 2090, signals of two values: H (high) level when a recording paper M is positioned on a −Z side of the second paper sensor 54, and L (low) level in the absence of the recording paper M. In other words, the second paper sensor 54 detects presence of the recording paper M.

In the following, operation of discriminating paper type of recording paper and controlling a light source will be described.

Numbers 1 to 6 are same as the above-described embodiment of FIGS. 1 to 14.

7. When a +X-side end portion of the recording paper M is located on the −Z side of the first paper sensor 53, output from the first paper sensor 53 is changed to H (high) level from L (low) level.

8. When the +X-side end portion of the recording paper M is located on the −Z side of the second paper sensor 54, output from the second paper sensor 54 is changed to H (high) level from L (low) level.

9. When output from the second paper sensor 54 is changed to H (high) level from L (low) level, a controller 100 turns on a plurality of VCSELs at the light source 11.

10. The controller 100 applies AD conversion to output from a light receiver 13 and a light receiver 15 to acquire received light amounts at the respective light receivers. The controller 100 repeatedly performs measurement of the received light amounts at the respective light receivers at predetermined time intervals.

11. When a −X-side end portion of the recording paper M is located on the −Z side of the first paper sensor 53, output from the first paper sensor 53 is changed to L (low) level from H (high) level.

12. When output from the first paper sensor 53 is changed to L (low) level from H (high) level, the controller 100 finishes measuring the received light amounts at the respective light receivers, and turns off the plurality of VCSELs at the light source 11.

13. The controller 100 acquires a value of S1 from a measurement result of the received light amount at the light receiver 13, and acquires a value of S2 from a measurement result of the received light amount at the light receiver 15. The controller 100 transmits the acquired values of S1 and S2 to the printer control device 2090.

14. The printer control device 2090 refers to a recording paper discrimination table upon receipt of the values of S1 and S2, and identifies a brand of the recording paper M from the acquired values of S1 and S2.

15. The printer control device 2090 saves the identified brand of the recording paper M in a RAM.

In this case, the light source 11 is turned on only while "presence of recording paper" is detected in both the first paper sensor 53 and the second paper sensor 54 as a period between time Tb and time Tc in FIG. 16, thereby achieving to turn on the light source 11 only when an opening O of a dark box 16 is closed with the recording paper M. As a result, the same result as the above embodiment can be obtained.

Meanwhile, there may be a case where abnormal conveyance of the recording paper M occurs and the output from both the first paper sensor 53 and the second paper sensor 54 remains at H (high) level. Here, the controller 100 is set so as to turn off the light source 11 regardless of output from the first paper sensor 53 and the second paper sensor 54 when a predetermined time passes after output from the second paper sensor 54 is changed to H (high) level from L (low) level. The predetermined time is a period from when the output for the second paper sensor 54 is changed to H (high) level from L (low) level in a normal state until when the recording paper M passes the optical sensor 50, and the period is calculated from a moving distance and a moving speed of the recording paper M at the time.

Therefore, even when the output from both the first paper sensor 53 and the second paper sensor 54 remains at H (high) level due to abnormal conveyance or the like, the controller 100 determines that the recording paper M has passed the optical sensor 50 when the predetermined time passes after the output from the second paper sensor 54 is changed to H (high) level from L (low) level, and the controller 100 turns off the light source 11 and notifies the printer control device 2090 of occurrence of abnormality.

Further, according to the above embodiment, the case where the sensor device is disposed inside the printer case 2200 has been described, but not limited thereto.

Referring now to FIGS. 17 to 21, a sensor device (referred to as "sensor device 2247B"), which is disposed outside a printer case 2200 in the vicinity of an operation panel, is described according to an embodiment of the present invention.

Figure 17:
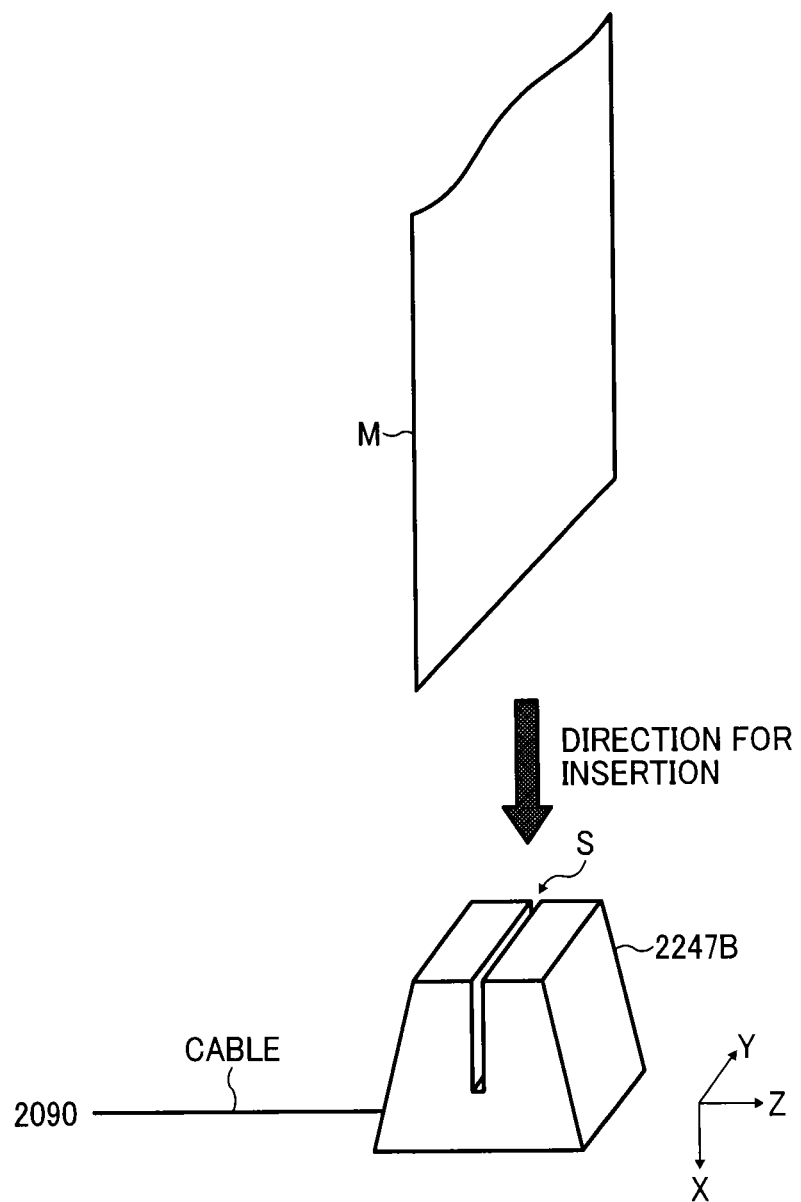
FIG. 17 is a diagram illustrating a sensor device that may be provided outside the printer in FIG. 1 according to an embodiment of the present invention.

The sensor device 2247B is a so-called stationary type, and has an outer shape of a truncated square pyramid as illustrated in an example of FIG. 17. A slit S having a predetermined depth in a direction for insertion of a recording paper M is provided such that the recording paper M is inserted into the slit S. Note that the direction in which the recording paper M is inserted into the slit S is a +X direction. The slit is made orthogonal to the YZ plane, corresponding to the surface where the sensor device 2247B is provided.

The sensor device 2247B is supplied with power from a color printer 2000 via a cable, and also controlled by the color printer 2000 via a wired interface such as an USB and an RS232C.

Figure 18:
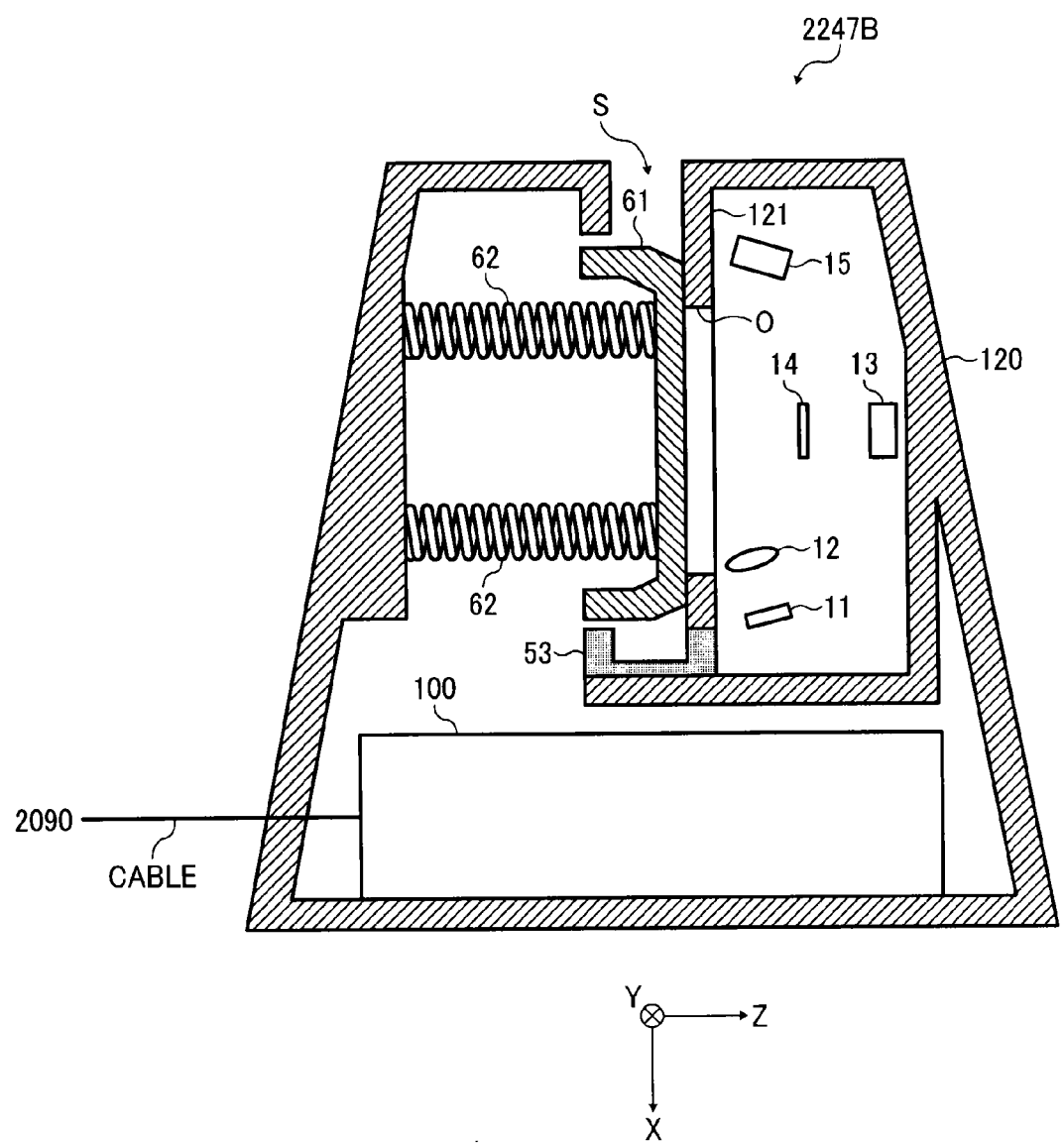
FIG. 18 is a diagram illustrating a configuration of the sensor device of FIG. 17 according to the embodiment of the present invention.
Figure 19:
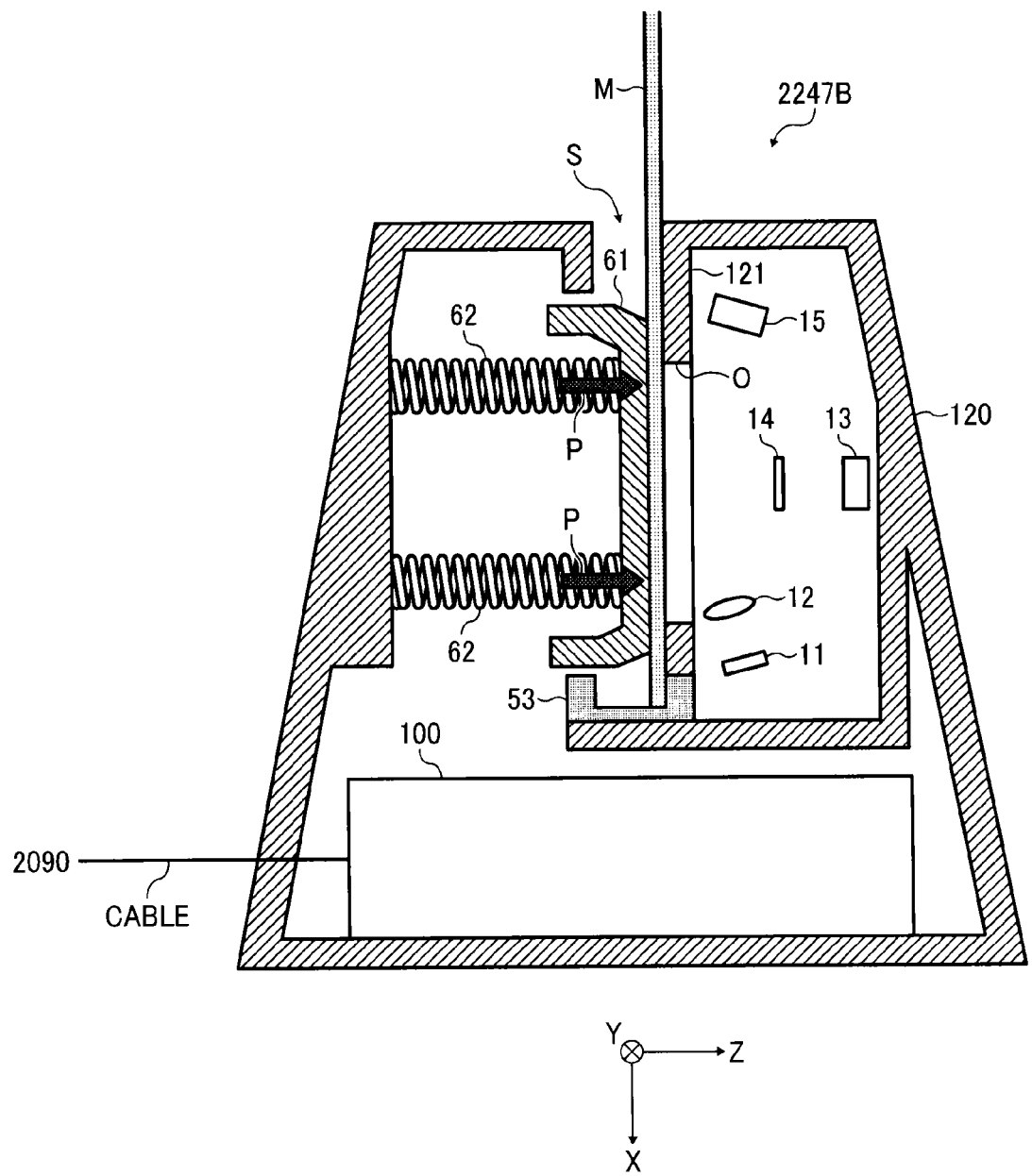
FIG. 19 is a diagram illustrating a relation between the sensor device of FIG. 17 and the recording paper according to the embodiment of the present invention.
Figure 20:
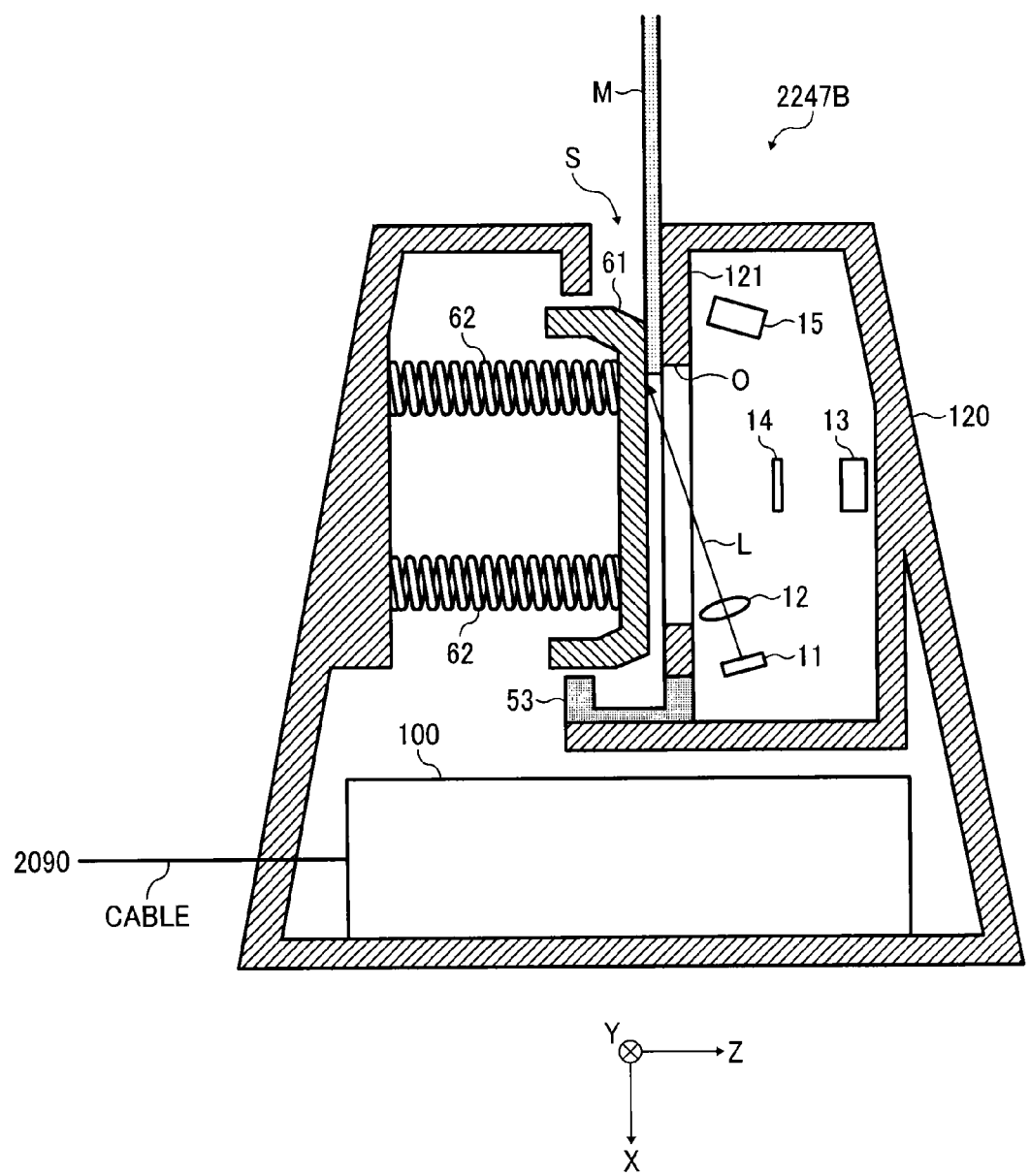
FIG. 20 is a diagram illustrating light that leaks outside the sensor device of FIG. 17.
Figure 21:
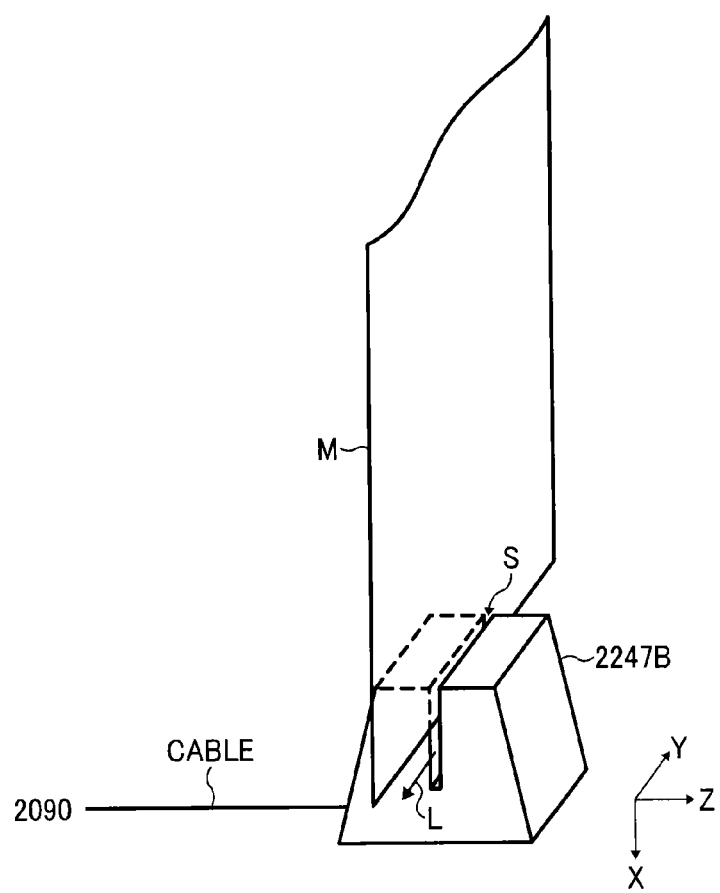
FIG. 21 is another diagram illustrating light that leaks outside the sensor device of FIG. 17.

The sensor device 2247B includes, as illustrated in an example of FIG. 18, an optical sensor equivalent to an optical sensor 50 described above, a paper sensor 53, a pressing plate 61, a plurality of springs 62, a controller 100, a sensor case 120, and so on. FIG. 18 is a diagram illustrating a state in which a −Y-side wall of the sensor case 120 is removed.

In the following, note that differences from the above embodiment will be mainly described and also components same as or equivalent to those of the above embodiment will be denoted by the same reference signs, and descriptions therefor will be simplified or omitted.

The sensor case 120 includes an inner wall 121 constituting a +Z-side wall surface of the slit S. Further, an optical sensor 50 is housed inside the sensor case 120 and on the +Z side of the inner wall 121. The optical sensor 50 is surrounded by walls having periphery applied with anti-reflection treatment. Further, an opening "O" is provided at the inner wall 121.

The pressing plate 61 is disposed on a −Z side of the inner wall 121, and attached to the sensor case 120 via the plurality of springs 62. When the recording paper M is not inserted into the slit S, a +Z-side surface of the pressing plate 61 contacts a −Z-side surface of the inner wall 121.

When the recording paper M is inserted into the slit S, the pressing plate 61 is moved in a −Z direction and the recording paper M passes between the inner wall 121 and the pressing plate 61. When the pressing plate 61 is moved in the −Z direction, pressurizing force in a +Z direction is applied to the pressing plate 61 by restoring force of the plurality of springs 62 (refer to FIG. 19). Then, the recording paper M is pressed by the pressing plate 61 against the inner wall 121. By this, an irradiating position and an incidence angle of light to the recording paper M become constant in the optical sensor, thereby achieving to have stable reflection light amount. In other words, accuracy of brand discrimination for the recording paper M can be improved.

Meanwhile, the pressurizing force applied by the plurality of springs 62 to the pressing plate 61 is not strong, and is set to such a level that an operator can easily pull out the recording paper M from the slit S.

The paper sensor 53 is a sensor to detect whether the recording paper M is inserted up to a predetermined position (up to a bottom, here) of the slit S. For example, the paper sensor 53 outputs, to the controller 100, a signal of H (high) level when the recording paper M is inserted up to the predetermined position, and outputs a signal of L (low) level when the recording paper M is not inserted up to the predetermined position.

In the following, operation of discriminating paper type of recording paper and controlling the light source 11 will be described.

1. An operator inputs a discrimination processing request via an operation panel. The discrimination processing request is notified from the operation panel to the controller 100 of the sensor device 2247B via a printer control device 2090.

2. The controller 100 starts measurement preparation upon receipt of the discrimination processing request.

3. The controller 100 transmits a notification of completion of measurement preparation to the printer control device 2090 upon completion of measurement preparation.

4. The printer control device 2090 displays, on the operation panel, a message to provide an instruction to insert the recording paper M into the slit S of the sensor device 2247B upon receipt of the notification of completion of measurement preparation.

5. The operator inserts the recording paper M into the slit S of the sensor device 2247B.

6. When the recording paper M is inserted up to the predetermined position, output from the paper sensor 53 is changed to H (high) level from L (low) level.

7. When output from the paper sensor 53 is changed to H (high) level from L (low) level, the controller 100 turns on a plurality of VCSELs at the light source 11, and further transmits a notification of recording paper detection to the printer control device 2090.

8. The controller 100 applies AD conversion to output from a light receiver 13 and a light receiver 15 to acquire received light amounts at the respective light receivers 13 and 15. The controller 100 repeatedly performs measurement of the received light amounts at the respective light receivers 13 and 15 at predetermined time intervals.

9. The printer control device 2090 displays, on the operation panel, a message to provide an instruction to pull out the recording paper M from the slit S of the sensor device 2247B when a predetermined time passes after receipt of the notification of recording paper detection.

10. The operator pulls out the recording paper M from the slit S of the sensor device 2247B.

11. When the recording paper M is pulled out from the slit S of the sensor device 2247B, output from the paper sensor 53 is changed to L (low) level from H (high) level.

12. When the output from the paper sensor 53 is changed to L (low) level from H (high) level, the controller 100 finishes measuring the received light amounts at the respective light receivers 13 and 15, and turns off the plurality of VCSELs at the light source 11.

13. The controller 100 acquires a value of S1 from a measurement result of the received light amount at the light receiver 13, and acquires a value of S2 from a measurement result of the received light amount at the light receiver 15. The controller 100 transmits the acquired values of S1 and S2 to the printer control device 2090.

14. The printer control device 2090 refers to a recording paper discrimination table upon receipt of the values of S1 and S2, and identifies a brand of the recording paper M from the acquired values of S1 and S2.

15. The printer control device 2090 saves the identified brand of the recording paper M in a RAM.

16. The printer control device 2090 displays the identified brand of the recording paper M and a message of measurement completion on the operation panel.

By the way, an opening of the sensor case 120 is hermetically closed with the pressing plate 61, but the opening is in communication with the slit S and the slit S is exposed to outside. Therefore, there may be possibility that a gap is formed due to mixture of a foreign matter, deform of a component, an accidental error at the time of assembly, etc. In the case where such a gap is formed, a laser beam leaks outside via the slit S (refer to FIGS. 20 and 21) and may affect the operator's eye when the light source 11 is turned on in the state that the opening of the sensor case 120 is not closed with the recording paper M.

However, output from the paper sensor 53 is utilized as one of control conditions for the light source 11 in the sensor device 2247B. When the paper sensor 53 detects "presence of recording paper", the controller 100 turns on the light source 11, and when the paper sensor 53 later detects "absence of recording paper", the controller 100 turns off the light source 11. Therefore, the light source 11 is turned on only when the opening of the sensor case 120 is closed with the recording paper M. As a result, even though the opening is exposed via the slit S, the laser beam can be prevented from leaking outside. Further, life of the light source 11 can be prolonged and power consumption can be reduced.

In the sensor device 2247B, the controller 100 determines whether the recording paper is inserted into the slit S based on output from the paper sensor 53, and further determines that the opening of the sensor case 120 is closed with the recording paper M when the paper sensor 53 detects "presence of recording paper".

Further, there may be a case where the recording paper M is kept inserted in the slit S of the sensor device 2247B for some reason. In the sensor device 2247B, the controller 100 is set such that the light source 11 is turned off regardless of output from the paper sensor 53 when a predetermined time passes after output from the paper sensor 53 is changed to H (high) level from L (low) level.

Accordingly, even when the output from the paper sensor 53 remains at H (high) level, the controller 100 turns off the light source 11 and notifies the printer control device 2090 of abnormality occurrence when the predetermined time passes after the output from the paper sensor 53 is changed to H (high) level from L (low) level.

For the paper sensor 53, a photo-interrupter, a photo-reflector described before, an ultrasonic sensor, a displacement sensor, etc. can be used. The photo-interrupter includes a light emitting member and a light receiving member facing each other, and determines presence of an object depending on whether light from the light emitting member is received by the light receiving member.

Note that the sensor device 2247B may include a power source. In this case, power supply from the color printer 2000 is not necessary.

Further, data exchange between the sensor device 2247B and the printer control device 2090 may be executed via radio such as personal area network (PAN) represented by Blue Tooth (registered trademark).

Further, the sensor device 2247B may also include an LED that is turned on when the paper sensor 53 detects "presence of recording paper". In this case, the operator can surely and easily find that the recording paper M is inserted up to the predetermined position.

Further, the sensor device disposed outside the printer case 2200 is not limited to the stationary type, and may be a so-called handy type sensor device (referred to as "sensor device 2247C").

Figure 22:
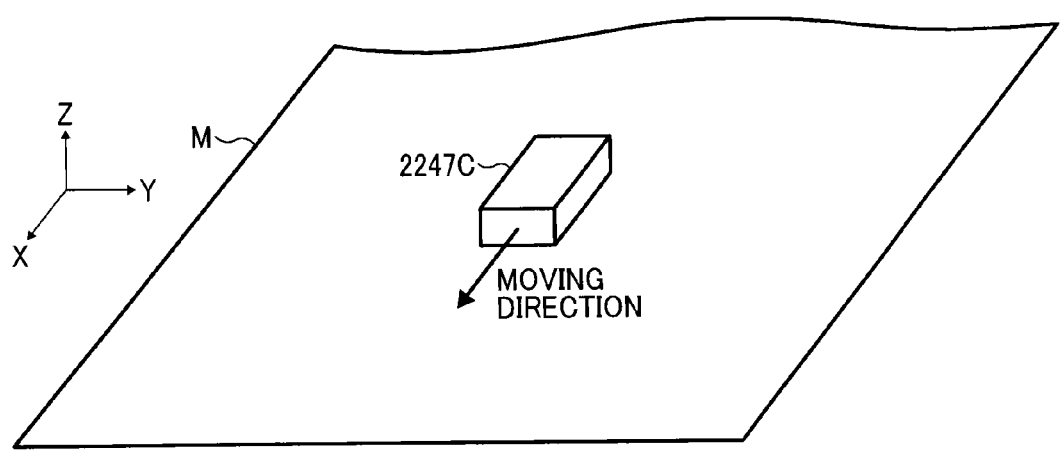
FIG. 22 is a diagram illustrating a sensor device that may be detached from the printer in FIG. 1 according to an embodiment of the present invention.
Figure 23:
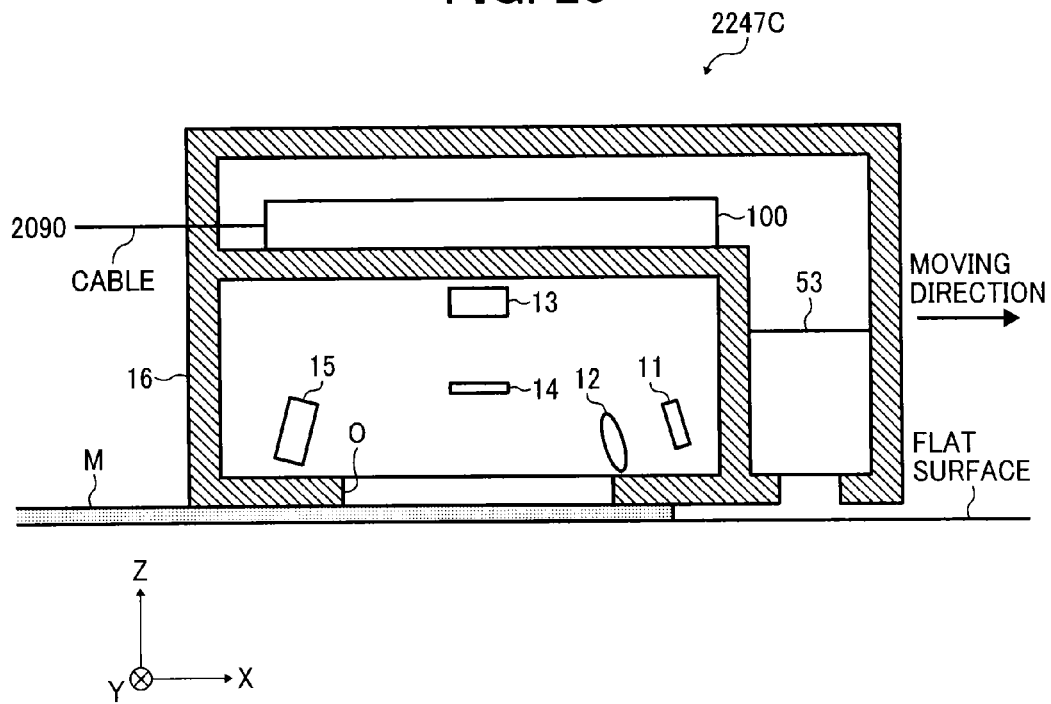
FIG. 23 is a diagram illustrating a configuration of the sensor device of FIG. 22 according to the embodiment of the present invention.
Figure 24:
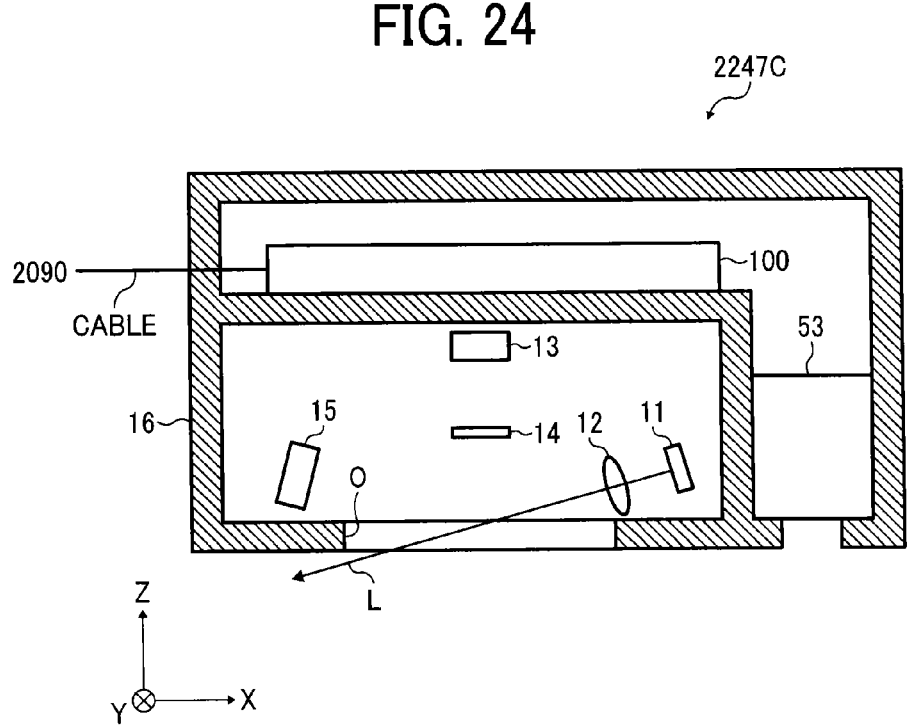
FIG. 24 is a diagram illustrating light that leaks outside the sensor device of FIG. 22.

Referring now to FIGS. 22 to 24, the sensor device 2247C is described according to an example embodiment of the present invention.

The sensor device 2247C is detachable from a printer case 2200, and disposed near an operation panel in a state such that an operator can pick up the sensor device with a hand.

Further, when a brand of a recording paper M is determined, the sensor device 2247C is moved by the operator in a +X direction on a surface of the recording paper M placed on a flat surface as illustrated in FIG. 22.

The sensor device 2247C is supplied with power from a color printer 2000 via a cable (not illustrated), and also controlled by the printer control device 2090 via a wired interface such as an USB and an RS232C.

The sensor device 2247C includes, as illustrated in an example in FIG. 23, an optical sensor equivalent to an optical sensor 50 above described, a paper sensor 53, a controller 100, a dark box 16, and so on. Note that FIG. 23 is a diagram illustrating a state in which a −Y-side wall of the dark box 16 is removed.

In the following, operation of discriminating paper type of recording paper and controlling the light source 11 will be described.

1. The operator inputs a discrimination processing request via the operation panel. The discrimination processing request is notified to the controller 100 of the sensor device 2247C from the operation panel via the printer control device 2090.

2. The controller 100 starts measurement preparation upon receipt of the discrimination processing request.

3. The controller 100 transmits a notification of completion of measurement preparation to the printer control device 2090 upon completion of measurement preparation.

4. The printer control device 2090 displays, on the operation panel, a message to provide an instruction to place the sensor device 2247C on the recording paper M upon receipt of the notification of completion of measurement preparation.

5. The operator places the sensor device 2247C on the recording paper M.

6. When the sensor device 2247C is placed on the recording paper M, output from the paper sensor 53 is changed to H (high) level from L (low) level.

7. When the output from the paper sensor 53 is changed to H (high) level from L (low) level, the controller 100 turns on a plurality of VCSELs at the light source 11.

8. The controller 100 applies AD conversion to output from a light receiver 13 and a light receiver 15 to acquire received light amounts at the respective light receivers 13 and 15. The controller 100 repeatedly performs measurement of the received light amounts at the respective light receivers 13 and 15 at predetermined time intervals.

9. The controller 100 transmits a measurement start notification to the printer control device 2090.

10. Upon receipt of the measurement start notification, the printer control device 2090 displays, on the operation panel, a message to provide an instruction to move the sensor device 2247C on the recording paper M.

11. The operator moves the sensor device 2247C in the +X direction.

12. The controller 100 finishes measuring the received light amounts at the respective light receivers 13 and 15, and turns off the plurality of VCSELs at the light source 11 after a predetermined time passes.

13. The controller 100 acquires a value of S1 from a measurement result of the received light amount at the light receiver 13, and acquires a value of S2 from a measurement result of the received light amount at the light receiver 15. The controller 100 transmits the acquired values of S1 and S2 to the printer control device 2090.

14. The printer control device 2090 refers to a recording paper discrimination table upon receipt of the values of S1 and S2, and identifies a brand of the recording paper M from the acquired values of S1 and S2.

15. The printer control device 2090 saves the identified brand of the recording paper M in a RAM.

16. The printer control device 2090 displays the identified brand of the recording paper M and a message of measurement completion on the operation panel.

Since an opening O of a dark box 16 is exposed outside, a laser beam leaks outside (refer to FIG. 24) via the opening O of the dark box 16 and may affect the operator's eye when the light source 11 is turned on in the state that the sensor device 2247C is not placed on the recording paper M. However, output from the paper sensor 53 is utilized as one of control conditions for the light source 11 in the sensor device 2247C. When the paper sensor 53 detects "presence of recording paper", the controller 100 turns on the light source 11, and when the paper sensor 53 later detects "absence of recording paper", the controller 100 turns off the light source 11. Therefore, the light source 11 is turned on only when the opening O of the dark box 16 is closed with the recording paper M. As a result, the laser beam can be prevented from leaking outside although the opening O is exposed outside. Further, life of the light source 11 can be prolonged and power consumption can be reduced.

In the sensor device 2247C, the controller 100 determines whether the dark box 16 is placed on the recording paper M based on output from the paper sensor 53, and also determines that the opening O of the dark box 16 is closed with the recording paper M when the paper sensor 53 detects "presence of recording paper".

Additionally, when output from the paper sensor 53 is changed to L (low) level from H (high) level by, for example, the operator lifting the sensor device 2247C during measurement before the predetermined time passes, the controller 100 turns off the light source 11 and transmits a notification of abnormality occurrence to the printer control device 2090.

Further, in the sensor device 2247C, a mark (e.g., arrow) indicating a moving direction of the sensor device 2247C may be attached to a sensor case 120.

Moreover, in the above sensor device 2247B and sensor device 2247C, a sensor to detect whether the operator is approaching close or contacting the sensor device may be provided (referred to as "sensor 55"). In other words, the sensor 55 detects presence of the operator. In this case, the controller 100 controls the light source 11 based on output from the paper sensor 53 and output from the sensor 55.

Figure 25:
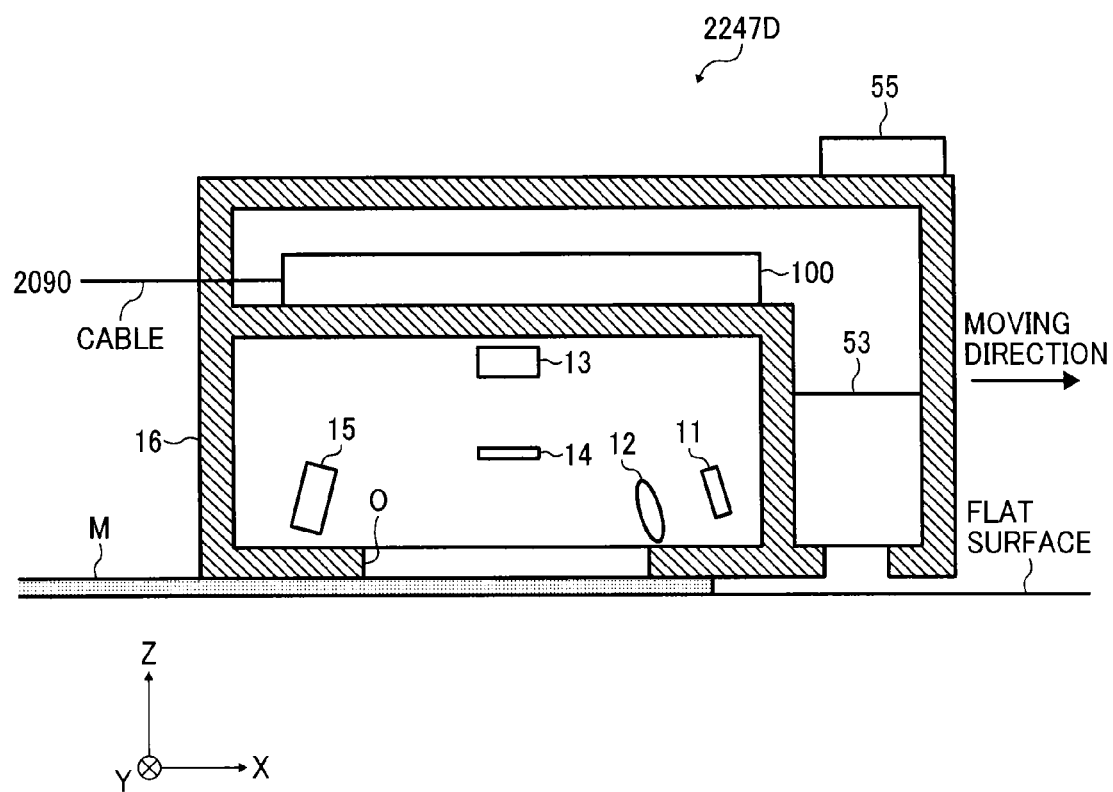
FIG. 25 is a diagram illustrating a configuration of a sensor device that may be detached from the printer of FIG. 1 according to an embodiment of the present invention.

Referring now to FIG. 25, a sensor device 2247D in which a sensor 55 is disposed at a sensor device 2247C is illustrated, according to an example embodiment of the present invention.

In this case, when a paper sensor 53 detects "presence of recording paper" and also the sensor 55 detects "presence of operator", a controller 100 turns on a plurality of VCSELs at a light source 11. Further, when the paper sensor 53 detects "absence of recording paper" or the sensor 55 detects "absence of operator", the controller 100 turns off the plurality of VCSELs at the light source 11.

In this case, for example, when the sensor 55 detects "absence of operator" by the operator moving the sensor device 2247D distant or the like during measurement, the controller 100 turns off the plurality of VCSELs at the light source 11 and also transmits the notification of abnormality occurrence to a printer control device 2090.

For the sensor 55, a capacitance touch sensor, a physical photo-reflector, and a sensor such as a micro switch that utilizes an amount of physical displacement may be used in addition to a motion sensor that does not utilize the amount of physical displacement. The sensor such as the micro sensor can be used when a state in which displacement is applied to the switch is detected as presence of the operator.

Referring now to FIGS. 26 to 31, a sensor device 2247E, which is a stationary type that is similar to the sensor device 2247B of FIG. 17, is described according to examples embodiment of the present invention. The senor device 2247E has an outer shape of a cuboid, with a slit S extending in parallel to the XY plane. The XY plane corresponds to a surface on which the sensor device 2247E is placed. In a substantially similar manner to the sensor device 2247B, the direction in which the recording paper M is inserted into the slit S is a +X direction.

The sensor device 2247E is supplied with power from a color printer 2000 via a cable, and also controlled by the color printer 2000 via a wired interface such as an USB and a RS232C.

Figure 27:
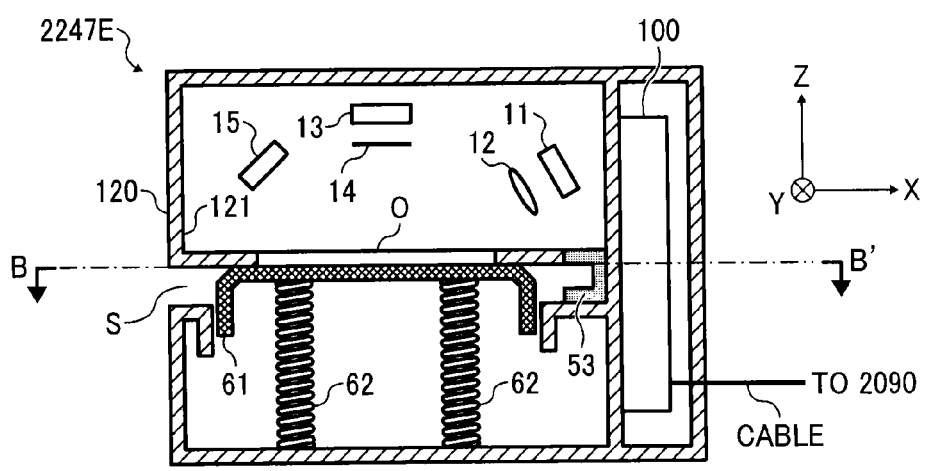
FIG. 27 is a diagram illustrating an example variation of the sensor device of FIG. 26.
Figure 28:
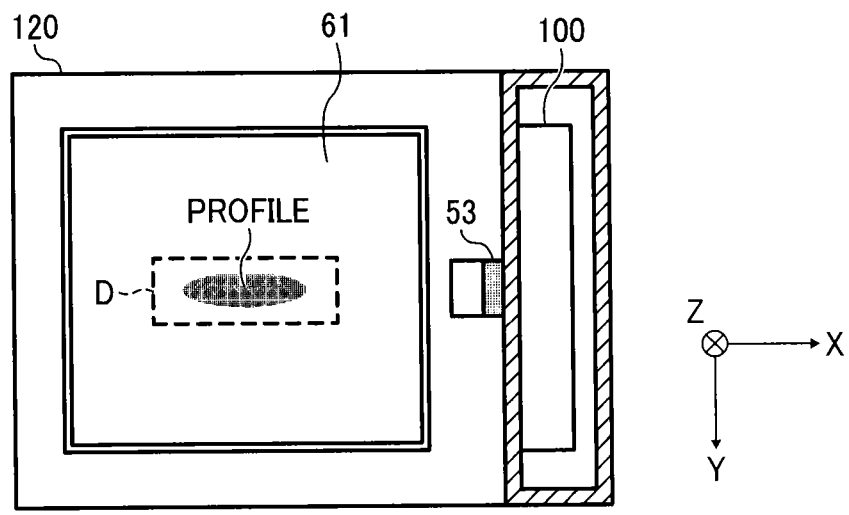
FIG. 28 is a diagram illustrating an example arrangement of opening and a paper sensor, in the sensor device of FIG. 27.

Referring to FIGS. 27 to 28, an example of the sensor device 2247E is described.

FIG. 27 is a diagram illustrating a state in which a −Y-side wall of the sensor case 120 of the sensor device 2247E is removed. The sensor device 2247E includes an optical sensor equivalent to the optical sensor 50 described above, a paper sensor 53, a pressing plate 61, a plurality of springs 62, a controller 100, a sensor case 120, and so on.

FIG. 28 is a diagram illustrating the sensor device 2247E when viewed in the −Z direction from the B-B' line of FIG. 27, which shows the positional relationship between the opening "O" and the paper sensor 53. The section D that is indicated by the dashed line corresponds to the opening. In FIG. 28, the opening D and the paper sensor 53 are arranged in the same line along the center of the Y-direction of the pressing plate 61. Since the light emitted from the light source 11 enters the pressing plate 61 obliquely, the opening D has a longitudinal length that extends in the X-direction corresponding to the beam profile of the entered light.

Figure 29:
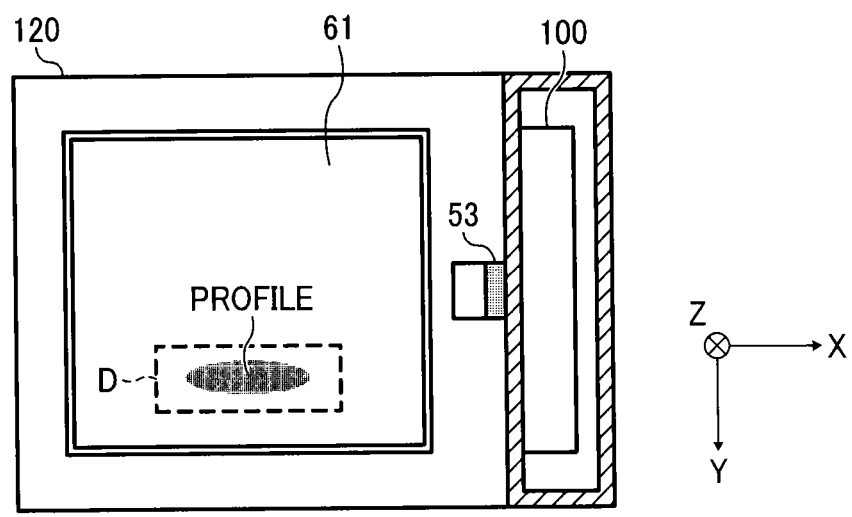
FIG. 29 is a diagram illustrating an example arrangement of opening and a paper sensor, in the sensor device of FIG. 27.

The arrangement of the opening D and the paper sensor 53 is not limited to this example, such that the opening may be arranged away from the center of the pressing plate 61 in the Y-direction as indicated by the opening D in FIG. 29.

Figure 30:
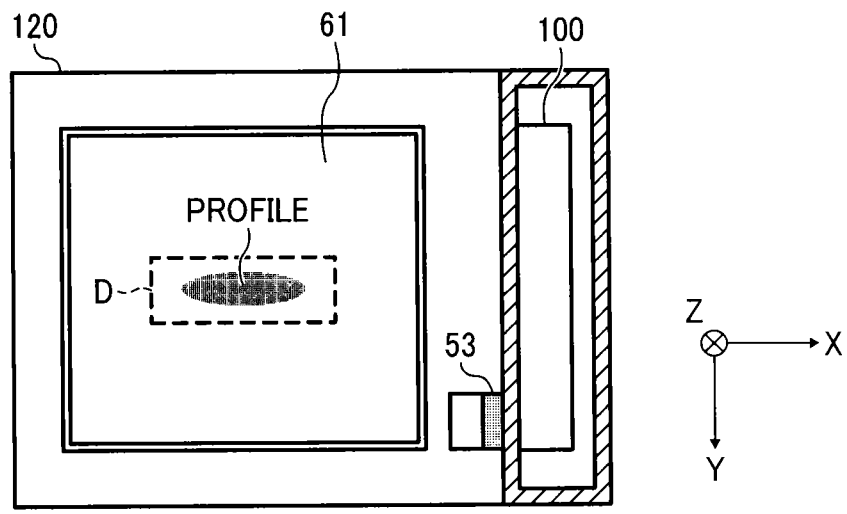
FIG. 30 is a diagram illustrating an example arrangement of opening and a paper sensor, in the sensor device of FIG. 27.
Figure 31:
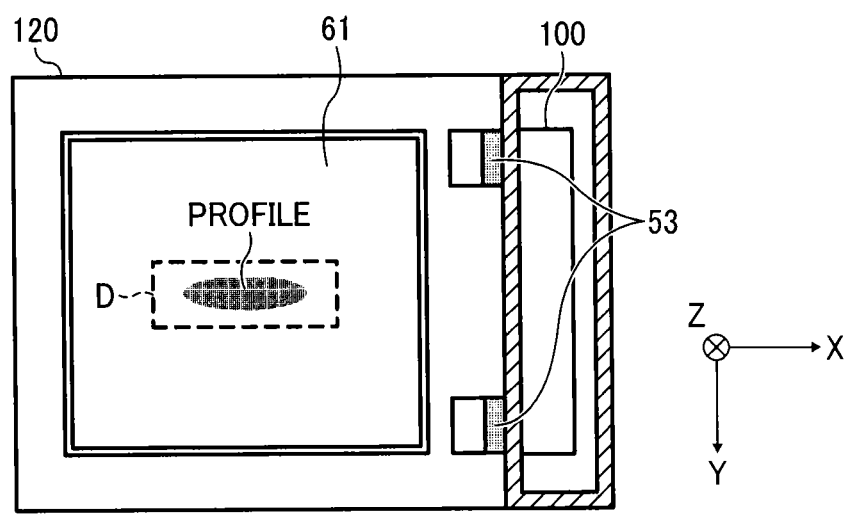
FIG. 31 is a diagram illustrating an example arrangement of opening and a paper sensor, in the sensor device of FIG. 27.

In a substantially similar manner, as illustrated in FIG. 30, the paper sensor 53 may be arranged away from the center of the pressing plate 61 in the Y-direction. Alternatively, as illustrated in FIG. 31, a plurality of paper sensors may be arranged.

With the configuration of the sensor device 2247E, the laser beam can be prevented from leaking outside.

Figure 26:
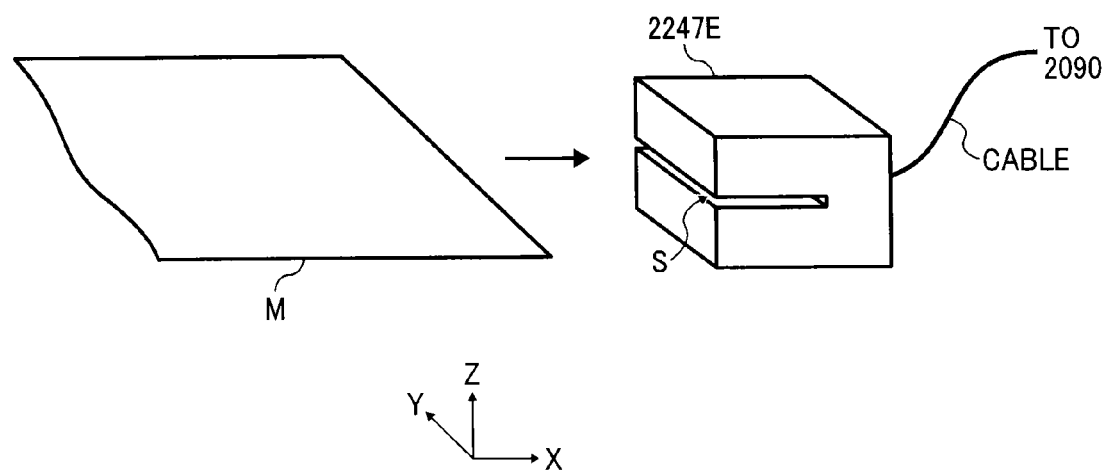
FIG. 26 is a diagram illustrating a configuration of a sensor device provided outside the printer in FIG. 1, according to an example embodiment of the present invention.

Referring to FIGS. 32 to 38, a sensor device 2247F, which is a modified example of the sensor device 2247E of FIG. 26, is described.

The sensor device 2247F of FIG. 32 has a paper sensor 54 arranged below the pressing plate 61 at the −Z side, and a dark box 122 provided separately from a sensor case 120. The dark box 122 accommodates therein a plurality of optical members (light source 11, collimate lens 12, two light receivers 13 and 15, polarization filter 14).

Figure 33:
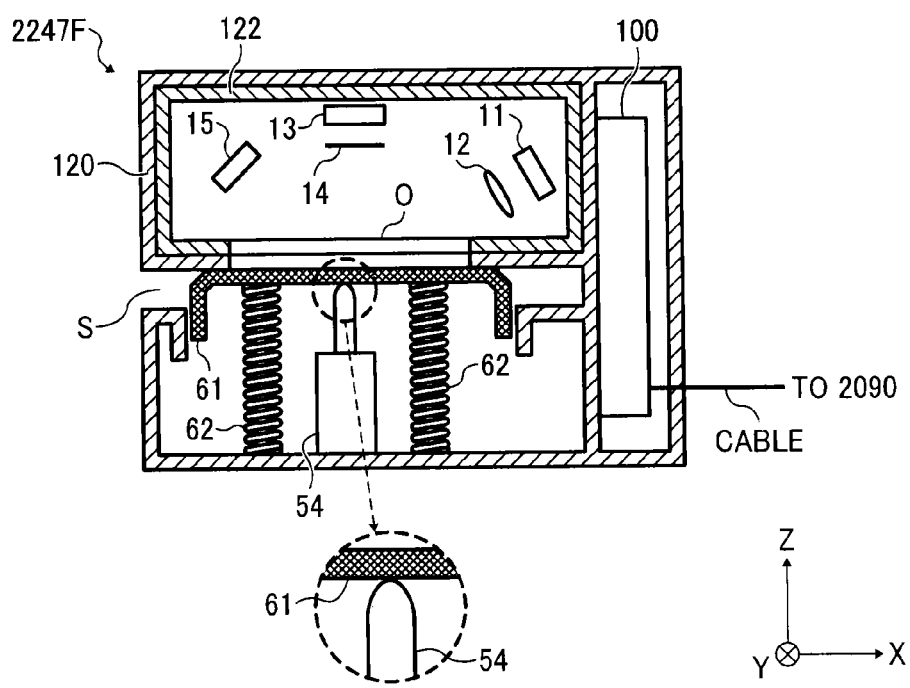
FIG. 33 is a diagram illustrating the sensor device of FIG. 32, with an enlarged view of a paper sensor.

As illustrated in FIG. 33, the paper sensor 54 has an end contacting the pressing plate 61. The paper sensor 54 detects the presence of paper due to displacement of the pressing plate 61 in the Z axis direction as paper is inserted.

Figure 32:
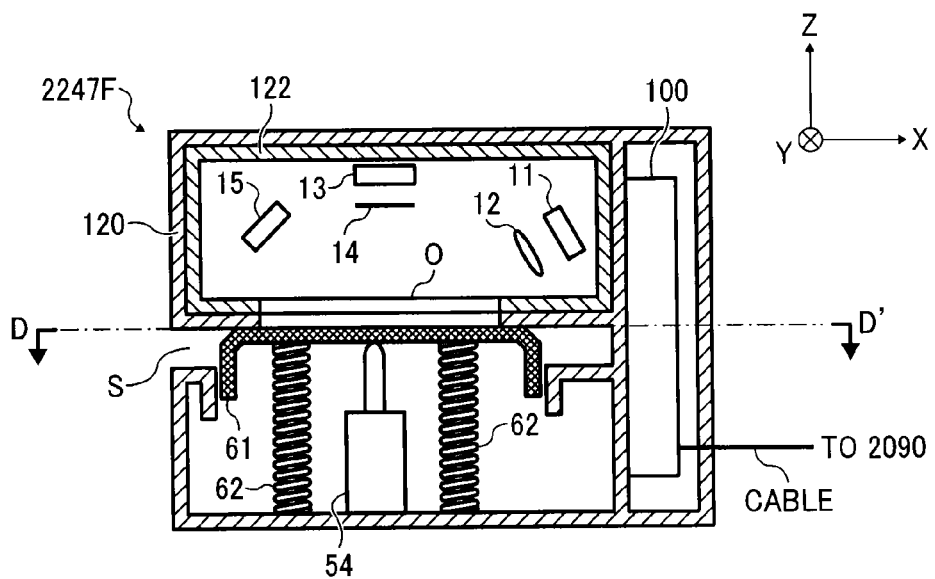
FIG. 32 is a diagram illustrating an example variation of the sensor device of FIG. 26.
Figure 34:
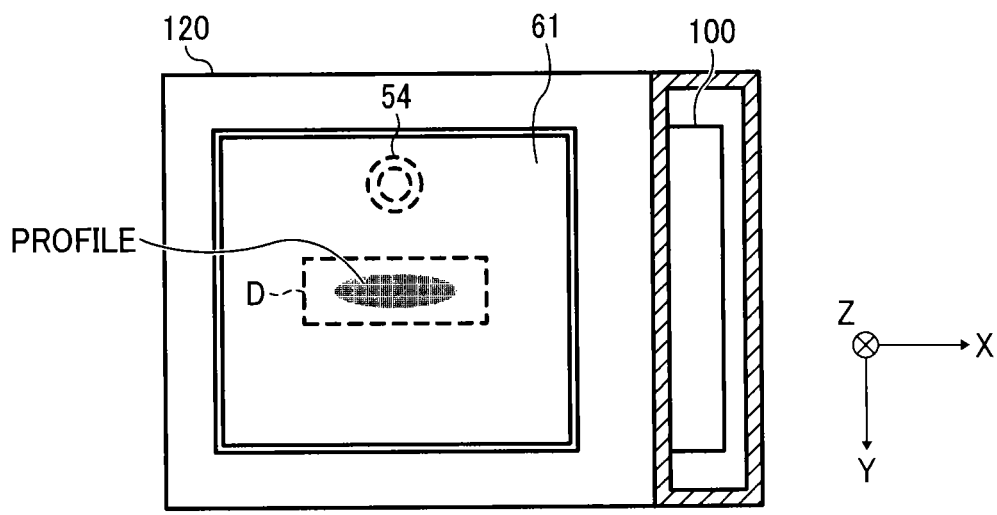
FIG. 34 is a diagram illustrating an example arrangement of opening and a paper sensor, in the sensor device of FIG. 32.

FIG. 34 is a diagram illustrating the sensor device 2247F when viewed in the −Z direction from the D-D' line of FIG. 32, which shows the positional relationship between the opening "O" and the paper sensor 54, when the paper sensor 54 contacts the pressing plate 61. The section D indicated by the dashed line corresponds to the opening. In FIG. 34, the opening D and the paper sensor 54 are arranged in the same line along the center of the X-direction of the pressing plate 61. The paper sensor 54 faces a portion of the sensor case 120 other than the opening D. Since the light emitted from the light source 11 enters the surface of the pressing plate 61 obliquely, the opening D has a longitudinal length that extends in the X-direction corresponding to the beam profile of the entered light.

Figure 35:
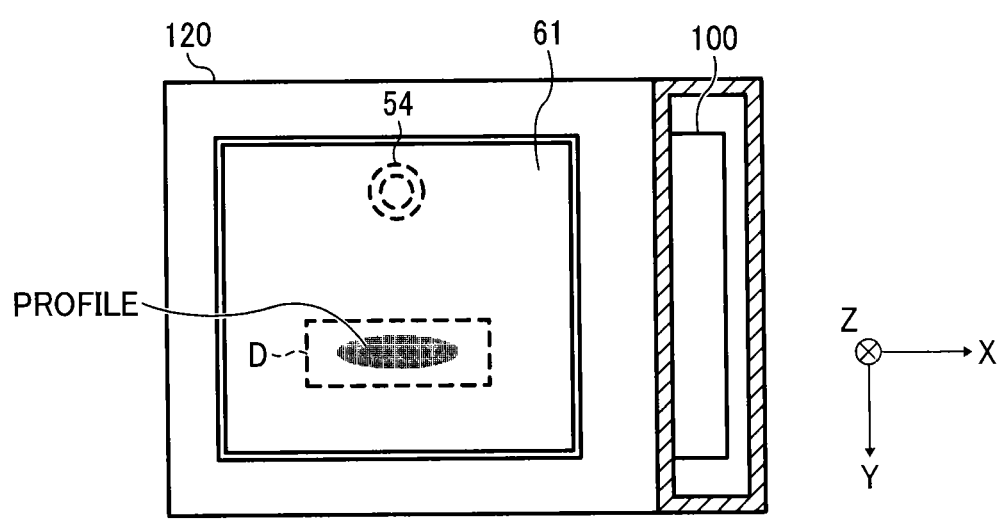
FIG. 35 is a diagram illustrating an example arrangement of opening and a paper sensor, in the sensor device of FIG. 32.

The arrangement of the opening D and the paper sensor 54 is not limited to this example, such that the opening may be arranged away from the center of the pressing plate 61 in the Y-direction as illustrated in FIG. 35.

Figure 36:
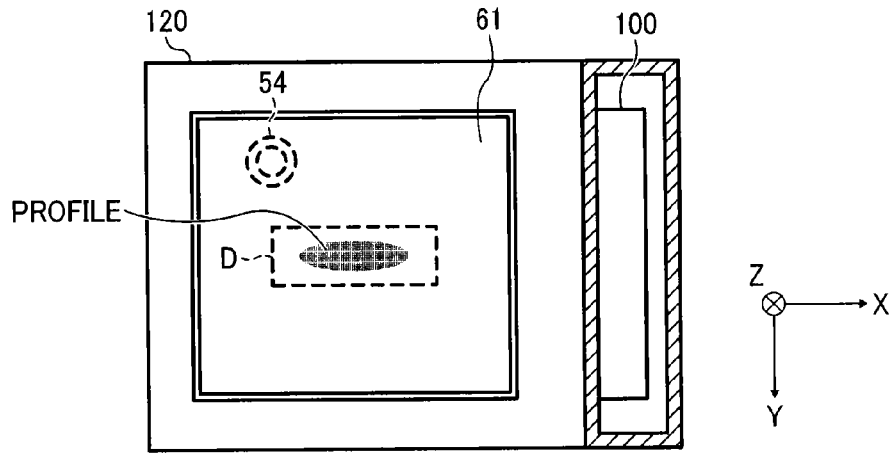
FIG. 36 is a diagram illustrating an example arrangement of opening and a paper sensor, in the sensor device of FIG. 32.
Figure 37:
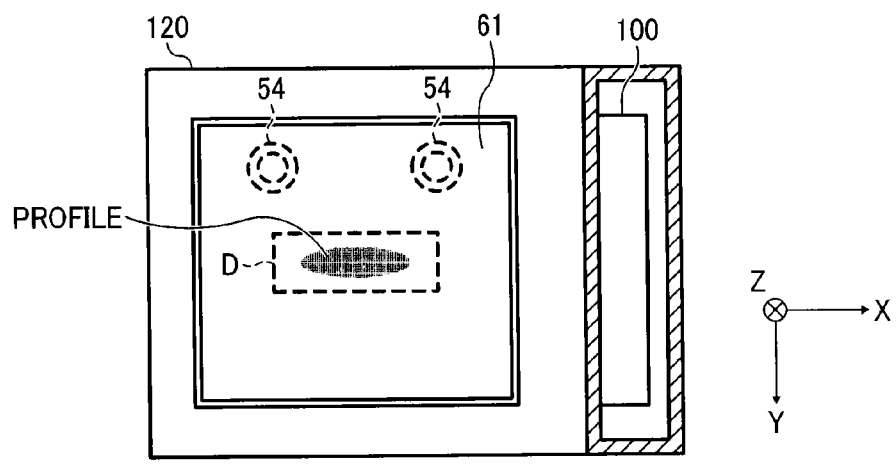
FIG. 37 is a diagram illustrating an example arrangement of opening and a paper sensor, in the sensor device of FIG. 32.

In a substantially similar manner, as illustrated in FIG. 36, the paper sensor 54 may be arranged away from the center of the pressing plate 61 in the X-direction. Alternatively, as illustrated in FIG. 37, a plurality of paper sensors may be arranged.

Figure 38:
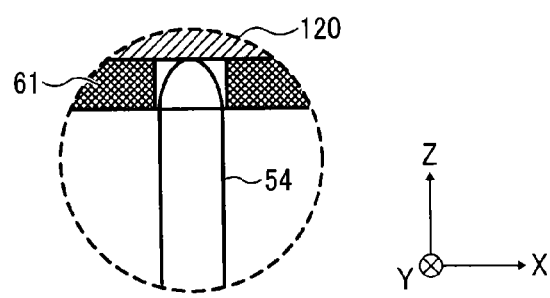
FIG. 38 is an enlarged view of a paper sensor that may be provided in the sensor device of FIG. 32.

Alternatively, when disposing the paper sensor 54 so as to face a portion of the sensor case 120 other than the opening, as illustrated in FIG. 38, the pressing plate 61 may have a through-hole through which an end of the paper sensor 54 contacts the sensor case 120. In such case, the paper sensor 54 detects presence of paper due to displacement of the end of the paper sensor 54 in the Z-direction as paper is inserted.

With this configuration of the sensor 2247F, the laser beam can be prevented from leaking outside.

Figure 39:
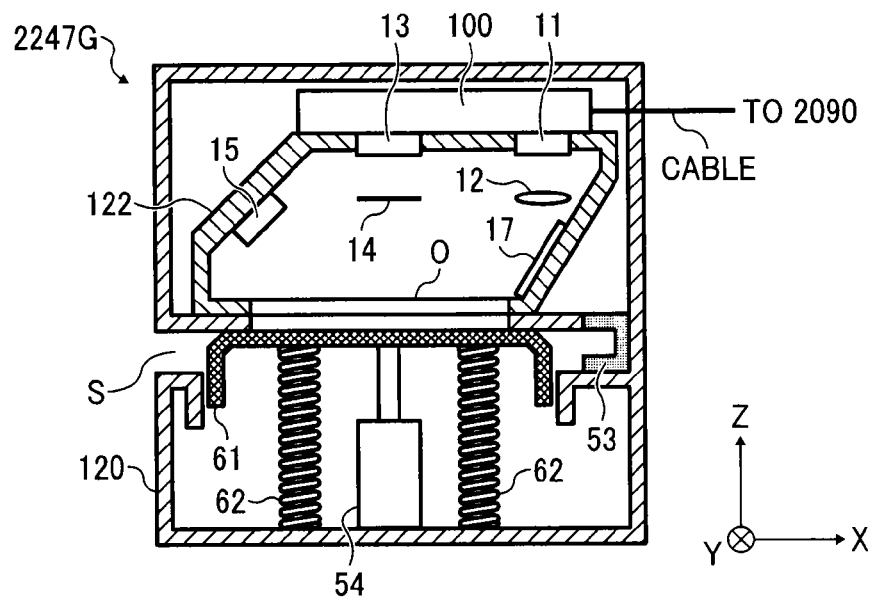
FIG. 39 is a diagram illustrating an example variation of the sensor device of FIG. 26.

FIG. 39 illustrates a sensor device 2247G, which is another modified example of the sensor device 2247E. In this example, in addition to the paper sensor 53, a paper sensor 54 is provided below the pressing plate 61 at the −Z side, which detects presence of paper based on the change caused on the paper sensor 54 when paper is inserted. Further, a dark box 122 is provided separately from the sensor case 120, which accommodates therein a plurality of optical members (light source 11, collimate lens 12, two light receivers 13 and 15, polarization filter 14, and mirror 17). The light source 11 is installed directly on the controller 100. The light emitted from the light source 11 enters the opening after it is reflected at a mirror 17. The sensor device 2247G of FIG. 39 controls the light source 11, based on the outputs from paper sensors 53 and 54.

With this configuration of the sensor device 2247G, the laser beam can be prevented from leaking outside.

Figure 40:
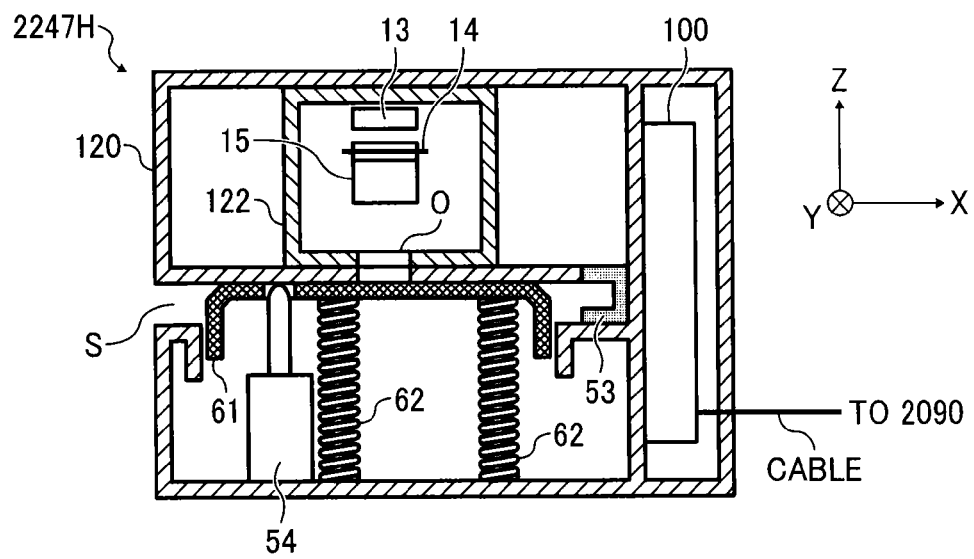
FIG. 40 is a diagram illustrating an example variation of the sensor device of FIG. 26.
Figure 41:
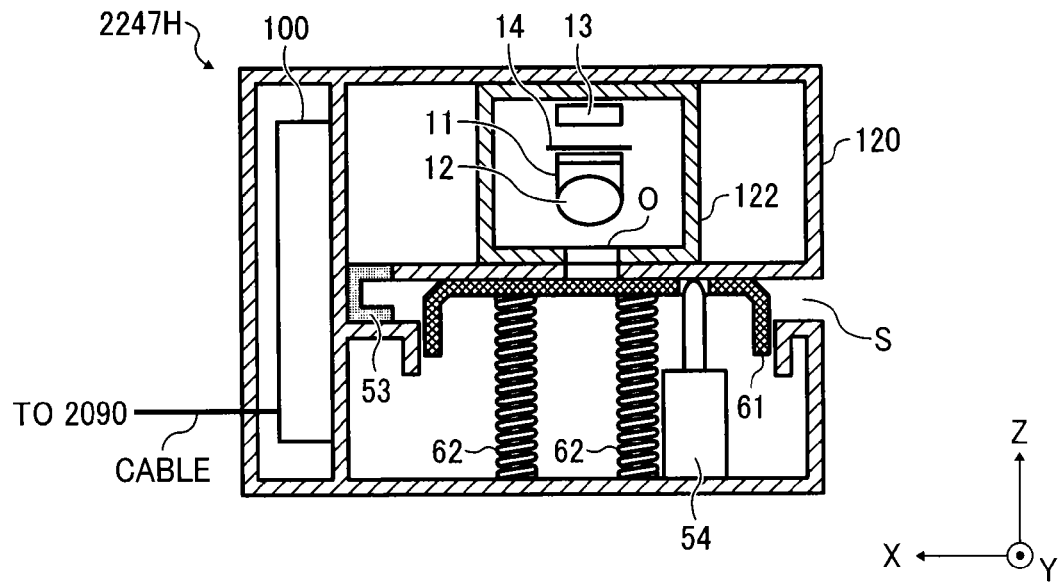
FIG. 41 is another diagram illustrating the sensor device of FIG. 40.

FIGS. 40 and 41 illustrate a sensor device 2247H, which is another example of the sensor device 2247E. In this example, in addition to the paper sensor 53, a paper sensor 54 is provided below the pressing plate 61 at the −Z side, which detects presence of paper based on the change caused on the paper sensor 54 when paper is inserted. The pressing plate 61 has a through-hole, through which the end of the paper sensor 54 contacts the sensor case 120. Further, a dark box 122 is provided separately from the sensor case 120, which accommodates therein a plurality of optical members (light source 11, collimate lens 12, two light receivers 13 and 15, polarization filter 14).

The light source 11 of the sensor 2247H is arranged such that it is rotated by about 90 degrees in the Z-axis with respect to the light source 11 of the sensor 2247E. Thus, the light source 11 emits light not in the X-direction, but in the Y-direction. The opening has a longitudinal length in the Y-direction, which corresponds to the beam profile of the light emitted from the light source 11. The sensor device 2247H controls the light source 11, based on outputs from the paper sensors 53 and 54.

With this configuration of the sensor device 2247H, the laser beam can be prevented from leaking outside.

Figure 42:
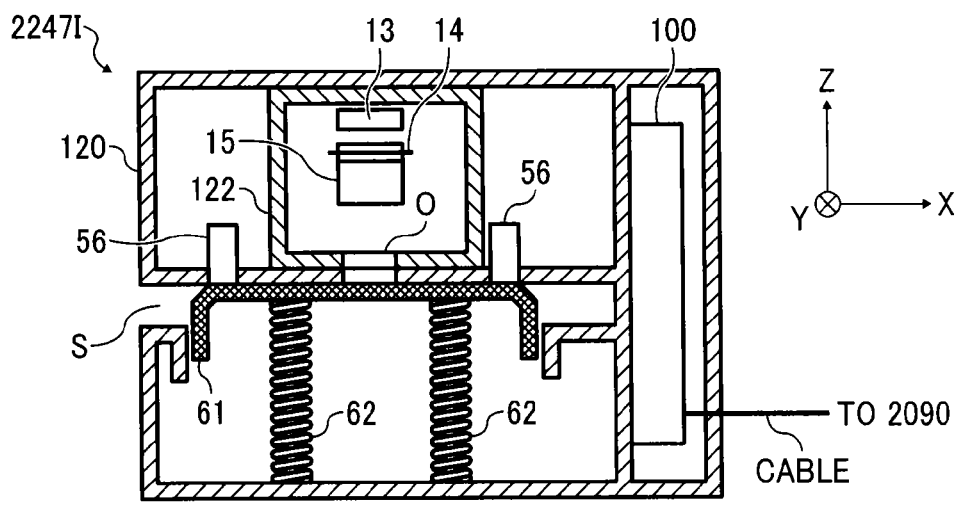
FIG. 42 is a diagram illustrating an example variation of the sensor device of FIG. 26.

FIG. 42 illustrates a sensor device 2247I, which is another example of the sensor device 2247E of FIG. 26. In this example, a paper sensor 56 is provided above a pressing plate 61 at the +Z side, which detects presence of paper based on the change in reflection of light or sound when paper is inserted. The number of paper sensors 53, or the location of paper sensor 53, is not limited to this example of FIG. 42, as long as the paper sensor 53 is not located at the dark box 122.

With this configuration of the sensor device 2247I, the laser beam can be prevented from leaking outside.

Figure 43:
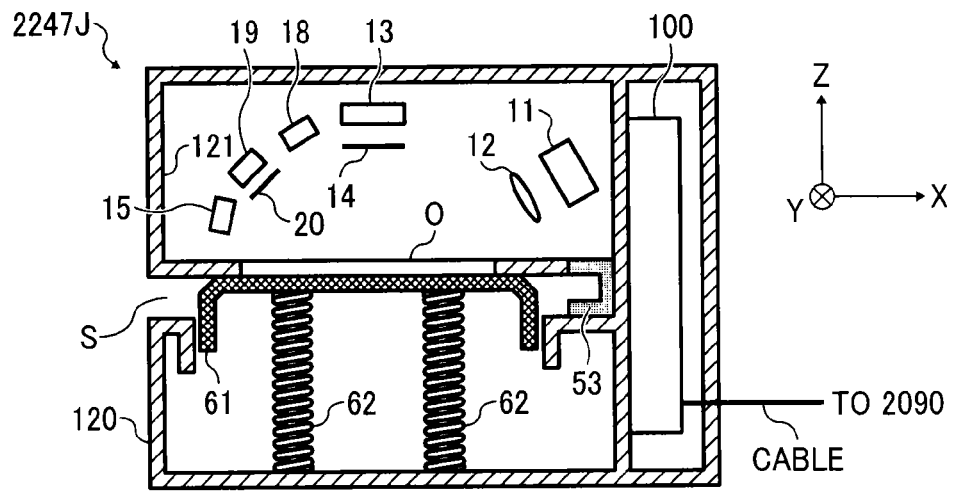
FIG. 43 is a diagram illustrating an example variation of the sensor device of FIG. 26.

FIG. 43 illustrates a sensor device 2247J, which is another example of the sensor device 2247E of FIG. 26. As illustrated in FIG. 43, a third light receiver 18, a fourth light receiver 19, and a second polarization filter 20 are additionally provided.

The light receiver 18 is arranged on, within an incidence plane at paper surface, an optical path of light diffused and reflected on paper surface as light enters paper surface. The polarization filter 20 is also provided, within an incidence plane at paper surface, on an optical path of light diffused and reflected on paper surface as light enters paper surface, and transmits P-polarization while blocking S-polarization. The light receiver 19 receives light transmitted through the polarization filter 20. Note that, when the recording paper is irradiated with the light flux from the light source 11, a signal is outputted from the light receiver. More specifically, a signal level of an output signal from the light receiver 18 is referred to as "S3" and a signal level of an output signal from the light receiver 19 is referred to as "S4".

Here, as for the recording papers of a plurality of brands that can be supported by the color printer 2000, value of S4/S1 and value of S3/S2 are preliminarily measured per brand of the recording papers before shipping such as during the process of adjustment, and the measurement results are stored in the ROM of the printer control device 2090 as "Recording Paper Discrimination Table". The printer control device 2090 refers to this table to obtain the values of S4/S1 and S3/S2, and determines a brand of the recording paper that is detected.

With the addition of light receivers, the sensor device 2247J is able to improve accuracy in determining paper type. Further, with the configuration of sensor device 2247J, the laser beam can be prevented from leaking outside. In alternative to the polarization filter 20, any desired polarization beam splitter may be used.

In this example, all of the light receiver 18, light receiver 19, and polarization filter 20 do not have to be provided. For example, only the light receiver 18 may be provided for the optical sensor 50 of the sensor device 2247J. In another example, the light receiver 19 and the polarization filter 20 may be provided for the optical sensor 50 of the sensor device 2247J. Even with such configuration, the sensor device 2247J is able to improve accuracy in determining paper type.

Figure 44:
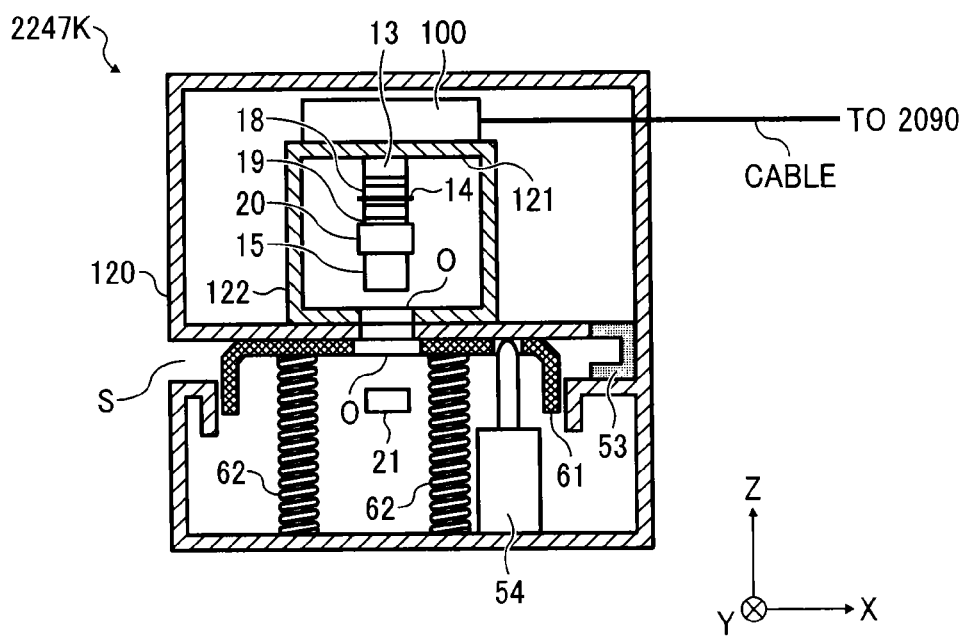
FIG. 44 is a diagram illustrating an example variation of the sensor device of FIG. 26.
Figure 45:
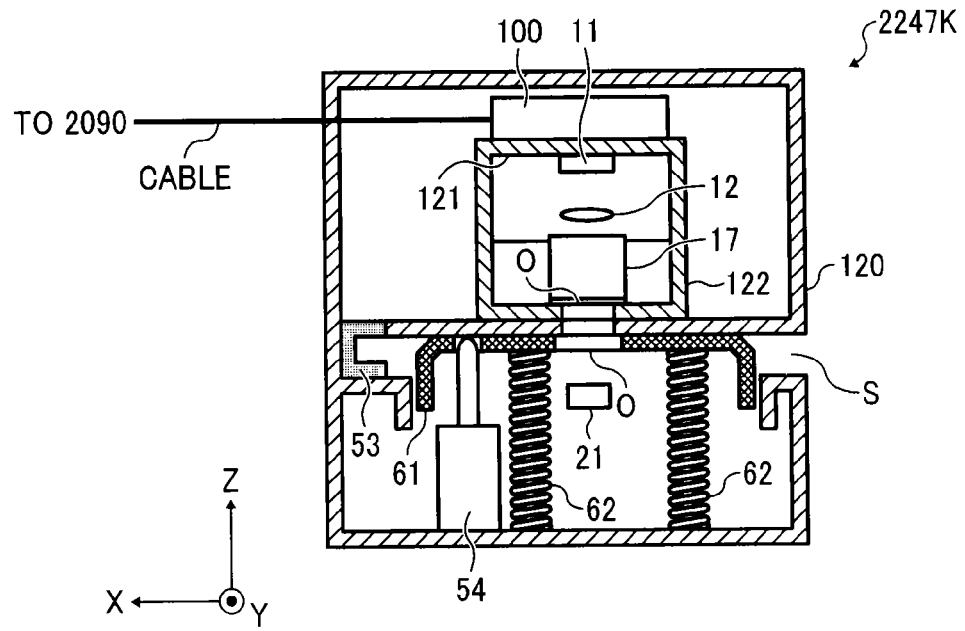
FIG. 45 is another diagram illustrating the sensor device of FIG. 44.
Figure 46:
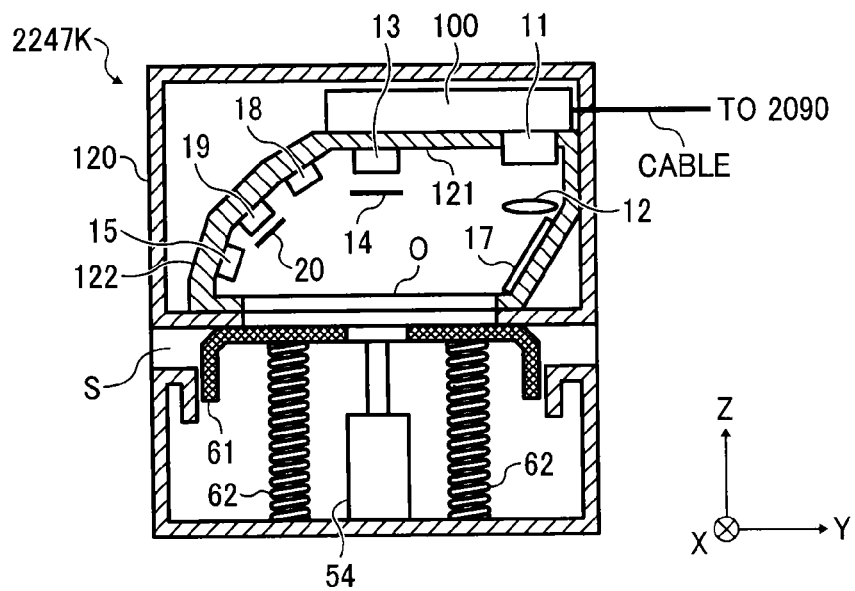
FIG. 46 is another diagram illustrating the sensor device of FIG. 44.

Referring to FIGS. 44 to 46, a sensor device 2247K, which is an example of the sensor device 2247E of FIG. 26, is described. The sensor device 2247K additionally includes the light receiver 18, light receiver 19, light receiver 21, and polarization filter 20 in the optical sensor 50 of the sensor device 2247E. The light receiver 21 transmits light passing through the recording paper. The pressing plate 61 is provided with an opening that passes the light transmitted through the paper being inserted. In alternative to opening, a portion of the pressing plate 61 through which light transmitted through the inserted paper passes may be made of a transparent material.

When the recording paper is irradiated with the light flux from the light source, an output signal is output from a light receiver. More specifically, a signal level of an output signal of the light receiver 21 is referred to as "ST".

As for the recording papers of a plurality of brands that can be supported by the color printer 2000, values of S4/S1, S3/S2, and ST are preliminarily measured per brand of the recording papers before shipping such as during the process of adjustment, and the measurement results are stored in the ROM of the printer control device 2090 as "Recording Paper Discrimination Table". The printer control device 2090 refers to this table to obtain the values of S4/S1, S3/S2, and ST, and determines a brand of the recording paper that is detected.

With the addition of light receivers, the sensor device 2247K is able to improve accuracy in determining paper type.

The sensor 2247K further includes a paper sensor 54 below the pressing plate 61 at the −Z side. The sensor device 2247K controls the light source 11, based on outputs from the paper sensors 53 and 54.

The light source 11 of the sensor device 2247K is disposed while being rotated by about 90 degrees in the Z axis from the light source 11 of the sensor device 2247E. The opening has a longitudinal length in the Y-direction, which corresponds to the beam profile of the light emitted from the light source 11. The sensor device 2247K further includes a dark box 122 separately from a sensor case 120, which accommodates therein a plurality of optical members of the optical sensor 50 (light source 11, collimate lens 12, two light receivers 13 and 15, polarization filter 14, etc.).

With this configuration of the sensor device 2247K, the laser beam can be prevented from leaking outside.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, in the sensor devices 2247, 2247A to 2247K, the number of the paper sensors is not limited to one, and plural paper sensors may be provided as well. In this case, types of the paper sensors are not needed to be unified, and optimal paper sensors may be selected respectively.

Also, in the sensor device 2247 and sensor devices 2247A to 2247K, processing of the controller 100 may be partly performed in the printer control device 2090.

Further, in the sensor device 2247 and sensor devices 2247A to 2247K, processing of the printer control device 2090 may be partly performed in the controller 100.

Additionally, according to the above embodiment, the case where an image forming apparatus includes four photoconductor drums has been described, but not limited thereto.

Further, according to the above embodiment, the case where the image forming apparatus is the color printer 2000 has been described, but not limited thereto, a light plotter or a digital copying device may also be adopted, for example.

Additionally, any one of the sensor devices 2247, 2247A to 2247K is applicable to an image forming apparatus in which an image is formed by jetting ink onto the recording paper.

The invention claimed is:

1. A sensor device comprising:
an irradiation unit to irradiate an object with light, the irradiation unit including a light source that emits the light;
an optical detection unit disposed on an optical path of light emitted from the irradiation unit and reflected at the object;
at least one object sensor configured to detect a presence of the object;
a case that houses at least the irradiation unit and that is provided with an opening to pass the light emitted from the irradiation unit;
a pressing mechanism that presses the object against the opening; and
a controller configured to control the light source based on output from the object sensor.

2. The sensor device according to claim 1, wherein
the irradiation unit is configured to emit the light from a direction oblique to a direction orthogonal to a surface of the object, the emitted light having linear polarization in a first polarization direction, and
the optical detection unit includes:
a first optical device disposed, within an incidence plane at the object, on an optical path of diffuse reflection light at the object, and configured to transmit a linear polarization component of the diffused and reflected light having a second polarization direction orthogonal to the first polarization direction;
a first optical detector configured to receive light transmissive through the first optical device; and
a second optical detector disposed on an optical path of specular reflection light emitted from the irradiation unit and reflected at the object.

3. The sensor device according to claim 2, wherein the optical path of diffuse reflection light in a normal direction of a surface of the object.

4. The sensor device according to claim 2, further comprising:
a third optical detector disposed on the optical path of the diffuse reflection light at the object.

5. The sensor device according to claim 2, further comprising:
a second optical device disposed on a second optical path of the diffuse reflection light at the object and configured to transmit a linear polarization component of the diffuse reflection light having the second polarization direction; and
a third optical detector configured to receive light transmissive through the second optical device.

6. The sensor device according to claim 2, further comprising:
a third optical detector disposed on a second optical path of the diffuse reflection light at the object;
a second optical device disposed on the second optical path of the diffuse reflection light at the object and configured to transmit a linear polarization component of the diffuse reflection light having the second polarization direction; and
a fourth optical detector configured to receive light transmissive through the second optical device.

7. The sensor device according to claim 2, further comprising:
a third optical detector configured to receive light emitted from the irradiation unit and reflected inside the object.

8. The sensor device according to claim 1, wherein
the controller determines that the opening is closed with the object when the object sensor detects presence of object.

9. The sensor device according to claim 8, wherein
the case includes a slit configured to communicate with the opening, and
the controller determines whether the object is inserted into the slit based on output from the object sensor.

10. The sensor device according to claim 8, wherein
the case is mountable on the object via the opening, and
the controller determines whether the case is mounted on the object based on output from the object sensor.

11. The sensor device according to claim 1, wherein the controller turns on the light source when the object sensor detects presence of object, and turns off the light source when the object sensor later detects absence of object.

12. The sensor device according to claim 1, further comprising:
at least one operator sensor configured to detect presence of an operator of the sensor device, wherein
the controller controls the light source based on output from the object sensor and output from the at least one operator sensor.

13. The sensor device according to claim 12, wherein the controller turns on the light source when the object sensor detects presence of the object and the at least one operator sensor detects presence of the operator, and the controller turns off the light source when the object sensor later detects absence of the object or the at least one operator sensor detects absence of the operator.

14. The sensor device according to claim 1, wherein the controller turns off the light source when a preset time elapses after the light source is turned on.

15. An image forming apparatus configured to form an image on a recording medium, the image forming apparatus comprising:
a sensor device comprising:
an irradiation unit to irradiate an object with light, the irradiation unit including a light source;
an optical detection unit disposed on an optical path of light emitted from the irradiation unit and reflected at the object;
at least one object sensor configured to detect a presence of the object;
a case that houses at least the irradiation unit and that is provided with an opening to pass the light emitted from the irradiation unit;
a pressing mechanism that presses the object against the opening; and
a controller configured to control the light source based on output from the object sensor; and
an adjustment device configured to adjust image forming conditions based on output from the sensor device.

16. A control method of controlling a light source in a sensor device including: an optical sensor configured to emit light from the light source of the optical sensor to an object and receive light reflected at the object; and at least one object sensor configured to detect presence of the object, the control method comprising:
turning on the light source when the object sensor detects presence of object; and
turning off the light source when the object sensor detects absence of object after the light source is turned on.

17. The control method for a light source according to claim 16, further comprising turning off the light source when a preset time elapses after the light source is turned on.

18. A control method of controlling a light source in a sensor device including: an optical sensor configured to emit light from the light source of the optical sensor to an object and receive light reflected at the object; at least one object sensor configured to detect presence of the object; and at least one operator sensor configured to detect presence of an operator of the sensor device, the control method comprising:
turning on the light source when the object sensor detects object presence and the at least one operator sensor detects presence of operator; and
turning off the light source when the object sensor detects absence of object or the at least one operator sensor detects absence of operator after the light source is turned on.

19. The control method for a light source according to claim 18, further comprising turning off the light source when a preset time elapses after the light source is turned on.

20. The sensor device according to claim 1, wherein the pressing mechanism closes the opening when the object is absent.

* * * * *